US012228882B2

(12) United States Patent
Ohmori et al.

(10) Patent No.: US 12,228,882 B2
(45) Date of Patent: Feb. 18, 2025

(54) TONER

(71) Applicant: CANON KABUSHIKI KAISHA, Tokyo (JP)

(72) Inventors: Atsuhiko Ohmori, Kanagawa (JP); Hiroki Kagawa, Shizuoka (JP); Keisuke Adachi, Tokyo (JP); Tomoko Sugita, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 498 days.

(21) Appl. No.: 17/660,146

(22) Filed: Apr. 21, 2022

(65) Prior Publication Data

US 2022/0373906 A1 Nov. 24, 2022

(30) Foreign Application Priority Data

Apr. 28, 2021 (JP) ................................ 2021-076193

(51) Int. Cl.
*G03G 9/08* (2006.01)
*G03G 9/087* (2006.01)
*G03G 9/093* (2006.01)

(52) U.S. Cl.
CPC ....... *G03G 9/0825* (2013.01); *G03G 9/08755* (2013.01); *G03G 9/09328* (2013.01)

(58) Field of Classification Search
CPC ............. G03G 9/0825; G03G 9/08755; G03G 9/09328; G03G 9/08711; G03G 9/09364; G03G 9/09716; G03G 9/09725; G03G 9/08782; G03G 9/087; G03G 9/09708
See application file for complete search history.

(56) References Cited

U.S. PATENT DOCUMENTS 7,141,342 B2 11/2006 Toyoda et al.
7,147,981 B2 12/2006 Fujikawa
7,264,910 B2 9/2007 Toyoda et al.
(Continued)

FOREIGN PATENT DOCUMENTS

EP 1 403 723 A2 3/2004
EP 2 280 311 A1 2/2011
(Continued)

OTHER PUBLICATIONS

U.S. Appl. No. 18/418,622, filed Jan. 22, 2024, Kosuke Fukudome.
(Continued)

*Primary Examiner* — Stewart A Fraser
(74) *Attorney, Agent, or Firm* — VENABLE LLP

(57) ABSTRACT

A toner comprising: a toner particle comprising a binder resin and a hydrocarbon wax; and inorganic fine particles, wherein the inorganic fine particles include silica fine particles surface-treated with specific polydimethylsiloxanes, a total amount of trimethylsilanol in the silica fine particles is from 1.0 ppm to 5.0 ppm, where a standard value of an amount of ions of an ester group is measured by time-of-flight secondary ion mass spectrometry, one or more peaks of the standard value are present within a range of 100 nm from the surface of the toner particle, and the maximum value A(d max) among the peaks of the standard value and the standard value A(0) on the surface of the toner particle satisfy the following relationships:

$$1.05 \leq A(d\ \max)/A(0) \leq 5.00,$$

$$A(0) \geq 0.010.$$

11 Claims, 2 Drawing Sheets

(56) References Cited

U.S. PATENT DOCUMENTS 7,279,262 B2 10/2007 Fujikawa
7,288,357 B2 10/2007 Toyoda et al.
7,368,211 B2 5/2008 Hasegawa
7,402,368 B2 7/2008 Ogawa
7,422,832 B2 9/2008 Ogawa
7,470,494 B2 12/2008 Nishiyama
7,582,401 B2 9/2009 Ogawa
7,678,524 B2 3/2010 Hasegawa
7,704,659 B2 4/2010 Ogawa
7,811,734 B2 10/2010 Ogawa
7,833,685 B2 11/2010 Tanaka et al.
7,833,687 B2 11/2010 Kato et al.
7,855,042 B2 12/2010 Kobori
7,939,231 B2 5/2011 Ogawa
8,084,174 B2 12/2011 Hasegawa
8,124,306 B2 2/2012 Hirata
8,211,606 B2 7/2012 Murai et al.
8,377,616 B2 2/2013 Tani et al.
8,501,377 B2 8/2013 Takahashi
8,512,925 B2 8/2013 Moribe
8,592,115 B2 * 11/2013 Kmiecik-Lawrynowicz ............... G03G 9/09725 430/108.7
8,614,044 B2 12/2013 Matsui et al.
8,628,899 B2 1/2014 Kawamura et al.
8,697,327 B2 4/2014 Shibata et al.
8,815,484 B2 8/2014 Tanaka et al.
8,883,389 B2 11/2014 Matsui et al.
8,916,319 B2 12/2014 Ikeda et al.
8,940,467 B2 1/2015 Hashimoto et al.
9,046,800 B2 6/2015 Hotta
9,097,998 B2 8/2015 Yamazaki
9,128,400 B2 9/2015 Takahashi
9,146,485 B2 9/2015 Tani et al.
9,152,065 B2 10/2015 Sano et al.
9,152,088 B1 10/2015 Kobori
9,158,217 B2 10/2015 Takahashi
9,213,250 B2 12/2015 Nomura et al.
9,213,251 B2 12/2015 Ohmori et al.
9,239,528 B2 1/2016 Hasegawa et al.
9,304,422 B2 4/2016 Matsui et al.
9,348,246 B2 5/2016 Magome et al.
9,348,253 B2 5/2016 Kanno
9,354,545 B2 5/2016 Matsui et al.
9,372,420 B2 6/2016 Mizo
9,417,540 B2 8/2016 Hashimoto
9,436,112 B2 9/2016 Iwasaki
9,442,416 B2 9/2016 Magome et al.
9,454,094 B2 9/2016 Tsujimoto
9,556,290 B2 1/2017 Nishiura et al.
9,606,466 B2 3/2017 Takahashi
9,651,883 B2 3/2017 Hama
9,665,021 B2 5/2017 Ohtsu
9,665,023 B2 5/2017 Kamae
9,665,026 B2 5/2017 Iwasaki
9,671,707 B2 6/2017 Minagawa
9,703,216 B2 7/2017 Tsuchida
9,715,187 B2 7/2017 Mukumoto et al.
9,829,814 B2 11/2017 Yoshida et al.
9,857,711 B2 1/2018 Yoshida et al.
9,897,934 B2 2/2018 Tamura
9,915,885 B2 3/2018 Katsumata
9,964,874 B2 5/2018 Suzumura et al.
9,969,834 B2 5/2018 Ohtsu
9,971,263 B2 5/2018 Fukudome et al.
10,012,918 B2 7/2018 Ishigami
10,012,920 B2 7/2018 Shibata
10,012,921 B2 7/2018 Kamae
10,036,970 B2 7/2018 Kanno
10,078,281 B2 9/2018 Ida
10,082,743 B2 9/2018 Hama
10,088,765 B2 10/2018 Miyakai
10,133,201 B2 11/2018 Kamae
10,146,146 B2 12/2018 Komatsu
10,175,595 B2 1/2019 Onozaki
10,197,936 B2 2/2019 Onozaki
10,203,619 B2 2/2019 Yamashita
10,216,108 B2 2/2019 Iwasaki
10,228,629 B2 3/2019 Tamura
10,234,777 B2 3/2019 Ohtsu
10,241,430 B2 3/2019 Kimura et al.
10,289,016 B2 5/2019 Fukudome et al.
10,295,921 B2 5/2019 Ohmori et al.
10,353,312 B2 7/2019 Kamae
10,401,748 B2 9/2019 Hashimoto
10,423,090 B2 9/2019 Ohtsu
10,451,985 B2 10/2019 Takahashi
10,451,986 B2 10/2019 Sano
10,451,990 B2 10/2019 Kamae
10,474,049 B2 11/2019 Onozaki
10,514,624 B2 12/2019 Tamura
10,551,759 B2 2/2020 Watanabe
10,642,178 B2 5/2020 Yamashita
10,747,132 B2 8/2020 Takahashi
10,747,134 B2 8/2020 Watanabe et al.
10,768,540 B2 9/2020 Watanabe et al.
10,768,543 B2 9/2020 Tsujimoto
10,775,710 B1 9/2020 Kamae
10,838,317 B2 11/2020 Sugahara
10,859,935 B2 12/2020 Ohtsu
10,859,936 B2 12/2020 Sugahara
10,877,386 B2 12/2020 Murayama
10,877,391 B2 12/2020 Matsuo
10,935,902 B2 3/2021 Kanno
10,955,765 B2 3/2021 Onozaki
10,969,704 B2 4/2021 Kagawa
11,112,709 B2 9/2021 Saeki
11,112,713 B2 9/2021 Akiyama et al.
11,131,938 B2 9/2021 Murayama
11,181,845 B2 11/2021 Shimoda et al.
11,249,410 B2 2/2022 Takahashi
11,249,412 B2 2/2022 Kawamura et al.
11,415,902 B2 8/2022 Watanabe
11,429,032 B2 8/2022 Shibata
11,698,594 B2 7/2023 Takahashi
11,720,036 B2 8/2023 Kobori
11,762,307 B2 9/2023 Tamura
11,796,930 B2 10/2023 Watanabe
11,809,132 B2 11/2023 Nagashima
2005/0053858 A1 3/2005 Yuasa
2008/0299482 A1 12/2008 Kato et al.
2010/0035171 A1 2/2010 Watanabe et al.
2010/0273103 A1 10/2010 Baba
2014/0356779 A1 12/2014 Hasegawa et al.
2014/0377697 A1 12/2014 Nishiura et al.
2015/0004539 A1 1/2015 Watanabe et al.
2015/0037726 A1 2/2015 Nomura et al.
2015/0086917 A1 3/2015 Iwasaki
2015/0153667 A1 6/2015 Noji et al.
2015/0185658 A1 7/2015 Wakabayashi et al.
2017/0060008 A1 * 3/2017 Okuda ............... G03G 5/14726
2019/0137901 A1 5/2019 Shimano
2019/0384197 A1 12/2019 Aoki et al.
2020/0209771 A1 7/2020 Hashimoto et al.
2020/0341395 A1 10/2020 Ookubo
2021/0003932 A1 1/2021 Tsuda
2021/0132519 A1 5/2021 Hashimoto et al.
2021/0286282 A1 9/2021 Kobori
2021/0302854 A1 9/2021 Kitamura
2021/0405549 A1 12/2021 Ookubo et al.
2022/0050398 A1 2/2022 Ooyama
2022/0128915 A1 4/2022 Toyoda et al.
2022/0128919 A1 4/2022 Kawamura et al.
2022/0146952 A1 5/2022 Komiya et al.
2022/0146955 A1 5/2022 Nozaki et al.
2022/0252995 A1 8/2022 Tsujimoto
2022/0373911 A1 11/2022 Kamae
2022/0373919 A1 11/2022 Imura
2023/0037779 A1 2/2023 Suzumura
2023/0122974 A1 4/2023 Kagawa
2023/0152725 A1 5/2023 Ochi
2023/0384702 A1 11/2023 Adachi
2023/0408940 A1 12/2023 Matsuo
2023/0408942 A1 12/2023 Kagawa

(56) References Cited

U.S. PATENT DOCUMENTS

| | | | |
|---|---|---|---|
| 2023/0408943 A1 | 12/2023 | Kitamura | |
| 2023/0408944 A1 | 12/2023 | Tsujimoto | |
| 2023/0408945 A1 | 12/2023 | Shibahara | |
| 2023/0408946 A1 | 12/2023 | Sato | |

FOREIGN PATENT DOCUMENTS

| | | | |
|---|---|---|---|
| JP | 63-155155 | A | 6/1988 |
| JP | 3-294864 | A | 12/1991 |
| JP | H05-107803 | A | 4/1993 |
| JP | 9-278413 | A | 10/1997 |
| JP | 2002-344338 | A | 8/2002 |
| JP | 2002-365843 | A | 12/2002 |
| JP | 2004-219609 | A | 8/2004 |
| JP | 2007-176747 | A | 7/2007 |
| JP | 2007-178470 | A | 7/2007 |
| JP | 2007-293183 | A | 11/2007 |
| JP | 2008-70719 | A | 3/2008 |
| JP | 2008-158394 | A | 7/2008 |
| JP | 2009-116355 | A | 5/2009 |
| JP | 2009-157161 | A | 7/2009 |
| JP | 2009-237525 | A | 10/2009 |
| JP | 2009-292915 | A | 12/2009 |
| JP | 2011-215310 | A | 10/2011 |
| JP | 2015-84095 | A | 4/2015 |
| JP | 2015-172744 | A | 10/2015 |
| JP | 2017-44981 | A | 3/2017 |
| JP | 2018-180146 | A | 11/2018 |
| JP | 2019-86642 | A | 6/2019 |
| JP | 2020-147467 | A | 9/2020 |

OTHER PUBLICATIONS

U.S. Appl. No. 18/418,635, filed Jan. 22, 2024, Hiroki Kagawa.
U.S. Appl. No. 18/418,782, filed Jan. 22, 2024, Atsuhiko Ohmori.
U.S. Appl. No. 18/493,903, filed Oct. 25, 2023, Ryuji Murayama.
U.S. Appl. No. 17/660,138, filed Apr. 21, 2022, Keisuke Adachi.
U.S. Appl. No. 17/804,879, filed Jun. 1, 2022, Hirofumi Kyuushima.
U.S. Appl. No. 17/804,880, filed Jun. 1, 2022, Tomoya Nagaoka.
U.S. Appl. No. 17/804,882, filed Jun. 1, 2022, Naoya Isono.
U.S. Appl. No. 17/804,883, filed Jun. 1, 2022, Takayuki Toyoda.
U.S. Appl. No. 17/805,357, filed Jun. 3, 2022, Kenji Aoki.

* cited by examiner

TONER

BACKGROUND OF THE INVENTION

Field of the Invention

The present disclosure relates to a toner that can be used in an electrophotographic image forming apparatus.

Description of the Related Art

Image forming apparatuses that use electrophotographic technique, such as copiers and printers, are required to have smaller size and also higher speed, higher image quality, and higher stability. In order to realize a compact apparatus, for example, fixing members such as rollers and films used for fixing toner to a recording medium such as paper have been simplified and reduced in size. Where the fixing members such as rollers and films are simplified and reduced in size, it becomes difficult for the toner to be sufficiently heated and pressurized in the fixing nip, so that the release agent inside the toner cannot sufficiently out-migrate, and the toner may adhere to the fixing film (hereinafter, referred to as low-temperature offset). To deal with such an adverse effect, a toner in which a toner particle includes a hydrocarbon wax as a release agent has been proposed.

In addition to these requirements, since a toner may be stored in a harsh environment also during the transportation from the time the toner is manufactured to the time it is used by a consumer, the toner is required to have storage stability that is not affected even by such transportation environment. However, when a toner including a hydrocarbon wax inside a toner particle is stored in a harsh environment where the temperature and humidity change rapidly, the hydrocarbon wax inside the toner particle may out-migrate to the toner particle surface. The hydrocarbon wax that has out-migrated to the toner particle surface may increase the adhesive force of the toner and form toner aggregates.

In the case of a one-component developer, the generated toner aggregates stay in a rubbing region between a toner bearing member and a charge-providing member, thereby adversely affecting an image (vertical streaks in a halftone image). In particular, where the toner is used for a long time in a high-temperature and high-humidity environment after being stored in a harsh environment where the temperature and humidity change rapidly, toner aggregates formed by the outmigration of hydrocarbon wax grow in size, and the adverse effect on the image becomes prominent. In other words, conventional toners including hydrocarbon wax are required to have improved storage stability and durability, which are not easily affected even when images are output for a long time in a high-temperature and high-humidity environment after storage in a harsh environment.

Accordingly, a toner to which silica fine particles coated with highly hydrophobic silicone oil are added, and a toner in which a shell having excellent heat resistance is provided on the toner particle surface have been investigated as means for further improving the storage stability and durability of toners containing hydrocarbon wax.

Japanese Patent Application Publication No. 2009-157161 proposes a toner to which silica fine particles hydrophobized with polydimethylsiloxane having a specific viscosity and modified side chains are added. Japanese Patent Application Publication No. 2017-044981 proposes a toner in which a toner particle is coated with a highly polar amorphous polyester resin having heat resistance and to which silica fine particles hydrophobized with polydimethylsiloxane are added.

SUMMARY OF THE INVENTION

As a result of studies by the present inventors, it is considered that in the toner described in Japanese Patent Application Publication No. 2009-157161, the addition of silica fine particles hydrophobized with highly hydrophobic polydimethylsiloxane to the toner particle increases the flowability of the toner in a high-temperature and high-humidity environment and improves durability. However, it has been found that when the toner is stored in a harsh environment where the temperature and humidity change rapidly, toner aggregates, which are presumed to be caused by the outmigration of hydrocarbon wax, are generated and adversely affect the image. In other words, it was found that there is room for improvement in storage stability in a harsh environment where temperature and humidity change rapidly.

In the toner described in Japanese Patent Application Publication No. 2017-044981, the toner particle is coated with a highly polar amorphous polyester resin having heat resistance. In addition, it is considered that by adding silica fine particles treated with highly hydrophobic polydimethylsiloxane to the toner, the flowability and charging performance in a high-temperature and high-humidity environment are improved, while suppressing the outmigration of hydrocarbon wax located inside the toner particle.

However, it was found that when the toner is stored in a harsh environment where the temperature and humidity change rapidly, as in Japanese Patent Application Publication No. 2009-157161, toner aggregates presumed to be caused by the outmigration of hydrocarbon wax are generated and adversely affect the image.

The present disclosure provides a toner such that the adverse effect on images caused by toner aggregates is unlikely to occur even when images are output for a long time in a high-temperature and high-humidity environment after storage in a harsh environment.

A toner comprising:

a toner particle comprising a binder resin and a hydrocarbon wax; and an inorganic fine particle, wherein the toner comprises, as the inorganic fine particle, a silica fine particle surface-treated with a polydimethylsiloxane represented by a following formula (A) and a polydimethylsiloxane represented by a following formula (B);

a total amount of trimethylsilanol in terms of octamethyltrisiloxane based on the mass of the silica fine particle in organic volatile component analysis of the silica fine particle at a heating temperature of 150° C. by a headspace method is 1.0 to 5.0 ppm;

where, in a measurement of the toner particle by time-of-flight secondary ion mass spectrometry measured from the surface of the toner particle to a depth of 100 nm, a value obtained by dividing an amount of ions of a structure represented by a following formula (C) by a total amount of counted ions is taken as a standard value, at least one peak of the standard value is present within a range of 100 nm from the surface of the toner particle;

(C)

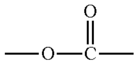

where the maximum value among the at least one peak of the standard value is denoted by A(d max), and the standard value on the toner particle surface is denoted by A(0), the A(d max) and the A(0) satisfy following formulas (1) and (2):

$$1.05 \leq A(dmax)/A(0) \leq 5.00 \quad (1)$$

$$A(0) \geq 0.010 \quad (2)$$

(A)

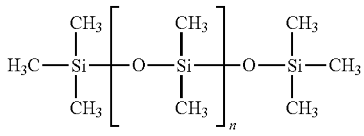

(B)

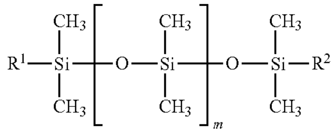

where, in the formula (B), $R^1$ is a carbinol group, a hydroxy group, an epoxy group, a carboxy group, an alkyl group, or a hydrogen atom, and $R^2$ is a carbinol group, a hydroxy group, an epoxy group, a carboxy group, or a hydrogen atom; n and m are average numbers of repeating units, n is 30 to 200, and m is 30 to 200; and each methyl group ($-CH_3$) of side chains in the formula (B) may be substituted with a carbinol group, a hydroxy group, an epoxy group, a carboxy group, or a hydrogen atom.

The present disclosure can provide a toner such that the adverse effect on images caused by toner aggregates is unlikely to occur even when images are output for a long time in a high-temperature and high-humidity environment after storage in a harsh environment. Further features of the present invention will become apparent from the following description of exemplary embodiments with reference to the attached drawings.

DESCRIPTION OF THE EMBODIMENTS

Figure 1:
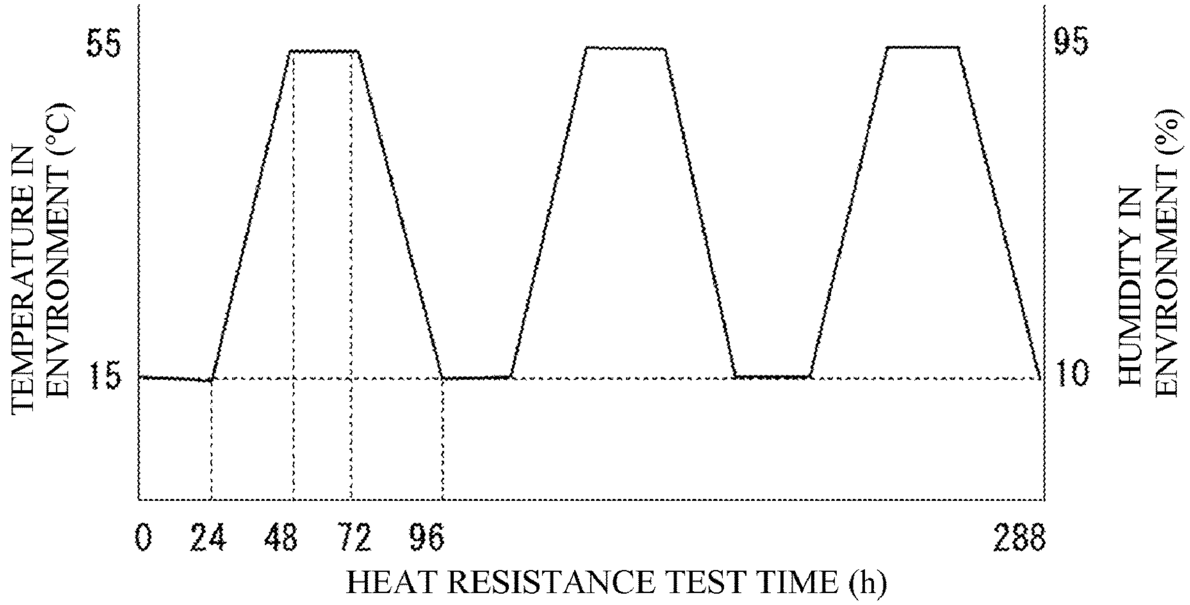
FIG. 1 is a time chart of a heat cycle.

Unless otherwise specified, the description of “from XX to YY” or “XX to YY” indicating a numerical range means a numerical range including a lower limit and an upper limit which are end points. When a numerical range is described step by step, the upper and lower limits of each numerical range can be arbitrarily combined.

The present inventors have diligently studied a toner including a hydrocarbon wax that can provide images with excellent appearance even when the images are output for a long time in a high-temperature and high-humidity environment after storage in a harsh environment.

The conventional approach to improving storage stability and durability of toner including hydrocarbon wax was to study toners in which a highly heat-resistant and highly polar shell was formed on the toner particle surface, or hydrophobized silica fine particles were added to the toner particle surface. By providing a highly heat-resistant and highly polar shell on the toner particle surface, it is possible to suppress the outmigration of hydrocarbon wax located inside the toner particle due to the difference in polarity, so that the storage stability can be improved. Further, by adding the hydrophobized silica fine particles to the toner particle surface, it is possible to suppress the decrease in the flowability of the toner when using the toner for a long time in a high-temperature and high-humidity environment, thereby improving the durability.

However, where the storage stability in a harsh environment where the temperature and humidity change rapidly, and the durability after storage in a harsh environment are considered, the heat-induced mobility of the hydrocarbon wax contained inside the toner particle is higher than that of a binder resin or the like and the hydrocarbon wax is likely to out-migrate to the toner particle surface when the temperature rises or falls. In particular, since the polydimethylsiloxane on the surface of the silica fine particles and the hydrocarbon wax are likely to be compatible with each other, the hydrocarbon wax is likely to out-migrate to the toner particle surface. As a result, the adhesive force of the toner increases, and toner aggregates are likely to occur. For example, in the case of a one-component developer, the generated toner aggregates stay in a contact region between a toner bearing member and a charge-providing member. As a result, the toner is not sufficiently charged, the density is lowered, fogging is generated in a non-image area during toner development, or vertical streaks are generated in a halftone image.

Japanese Patent Application Publication No. 2009-157161 proposes a toner to which silica fine particles hydrophobized with a polydimethylsiloxane in which a side chain is modified with a hydroxy group or a phenyl group are added. In the silica fine particles described in Japanese Patent Application Publication No. 2009-157161, since there is a functional group in the side chain of the polydimethylsiloxane, reactivity with silica is high and the amount of polydimethylsiloxane transferred to the toner particle surface is reduced. Therefore, it is possible to suppress the increase in adhesive force of the toner and the decrease in flowability of the toner.

However, since the toner has a vinyl resin on the surface and the polarity is lower than that of a polyester resin or the like, the toner is likely to be compatible with the polydimethylsiloxane on the silica fine particle surface, and the shielding ability against hydrocarbon wax of the shell is lowered. It is considered that as a result, the outmigration of hydrocarbon wax cannot be suppressed when the toner is stored in a harsh environment, and toner aggregates are generated. For this reason, when the toner is used for a long time in a high-temperature and high-humidity environment after storage in a harsh environment, the images are adversely affected by toner aggregates.

Meanwhile, Japanese Patent Application Publication No. 2017-044981 proposes a toner in which a shell of highly polar amorphous polyester resin shell having heat resistance is present on the toner particle surface, and which has silica fine particles hydrophobized with a polydimethylsiloxane such as represented by a formula (A). However, it has been found that even with such a toner, the images are adversely affected by toner aggregates.

The present inventors consider the following reason why the adverse effect on images is generated. First, in the silica fine particles hydrophobized with the polydimethylsiloxane represented by the formula (A), a part of the polydimethylsiloxane reacts with the silica base during the surface treatment and adhere to the silica fine particles. The present inventors think that when the polydimethylsiloxane represented by the formula (A) reacts with the silica base, the trimethylsilyl group at the end of the polydimethylsiloxane is eliminated, and the end is changed to a silanol group and then reacts with the silica base. Therefore, the silica fine particles hydrophobized with the polydimethylsiloxane represented by the formula (A) include trimethylsilanol which is a by-product.

Next, trimethylsilanol is a basic substance and has polarity. Therefore, trimethylsilanol tends to be easily compatible with the toner particle surface having high polarity due to electrostatic interaction. Further, since the polydimethylsiloxane and trimethylsilanol contained in the silica fine particles contain a trimethylsilyl group, they tend to be compatible with each other. As a result, when the amount of trimethylsilanol in the silica fine particles increases, trimethylsilanol acts as a bridge between the polydimethylsiloxane in the silica fine particles and the toner particle surface having high polarity. As a result, a part of the polydimethylsiloxane of the silica fine particles, which is represented by the formula (A), and a shell having high polarity are likely to become compatible with each other. Since the shell on the toner surface is compatible with a part of the hydrophobic polydimethylsiloxane, the shielding property of the shell against the hydrocarbon wax is lowered.

When the toner is stored in a harsh environment where the temperature and humidity change rapidly after the shielding property against the hydrocarbon wax has been lowered, the hydrocarbon wax contained inside the toner particle is likely to out-migrate. As a result, the hydrocarbon wax out-migrates to the toner surface, so that the adhesive force of the toner increases and toner aggregates are likely to occur. In addition, the present inventors consider that when the toner is used for a long time in a high-temperature and high-humidity environment, vertical streaks may occur in the halftone image due to the toner aggregates generated in storage in a harsh environment.

As a result of diligent studies by the present inventors, it was found that because of the following configuration, a toner including a hydrocarbon wax can provide high-quality images even when images are output for a long time in a high-temperature and high-humidity environment after storage in a harsh environment.

That is, the present disclosure relates to a toner comprising:

a toner particle comprising a binder resin and a hydrocarbon wax; and an inorganic fine particle, wherein the toner comprises, as the inorganic fine particle, a silica fine particle surface-treated with a polydimethylsiloxane represented by a following formula (A) and a polydimethylsiloxane represented by a following formula (B);

a total amount of trimethylsilanol in terms of octamethyltrisiloxane based on the mass of the silica fine particle in organic volatile component analysis of the silica fine particle at a heating temperature of 150° C. by a headspace method is 1.0 to 5.0 ppm;

where, in a measurement of the toner particle by time-of-flight secondary ion mass spectrometry measured from the surface of the toner particle to a depth of 100 nm, a value obtained by dividing an amount of ions of a structure represented by a following formula (C) by a total amount of counted ions is taken as a standard value, at least one peak of the standard value is present within a range of 100 nm from the surface of the toner particle;

(C)

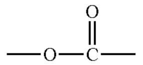

where the maximum value among the at least one peak of the standard value is denoted by A(d max), and the standard value on the toner particle surface is denoted by A(0), the A(d max) and the A(0) satisfy following formulas (1) and (2):

$$1.05 \leq A(dmax)/A(0) \leq 5.00 \quad (1)$$

$$A(0) \geq 0.010 \quad (2)$$

(A)

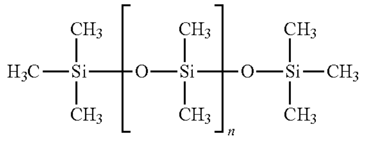

(B)

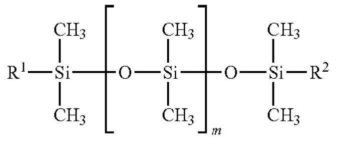

where, in the formula (B), $R^1$ is a carbinol group, a hydroxy group, an epoxy group, a carboxy group, an alkyl group, or a hydrogen atom, and $R^2$ is a carbinol group, a hydroxy group, an epoxy group, a carboxy group, or a hydrogen atom; n and m are average numbers of repeating units, n is 30 to 200, and m is 30 to 200; and each methyl group ($-CH_3$) of side chains in the formula (B) may be substituted with a carbinol group, a hydroxy group, an epoxy group, a carboxy group, or a hydrogen atom.

Discussed hereinbelow is the reason why the abovementioned performance can be imparted by treating the silica fine particles with the polydimethylsiloxanes represented by the formulas (A) and (B) and controlling the amount of trimethylsilanol in the silica fine particle and the distribution of ester group concentration near the toner surface. The present inventors have found that for a toner including hydrocarbon wax, the following points are important for suppressing the outmigration of hydrocarbon wax in storage in a harsh environment and suppressing an adverse effect on images in long-term usage in a high-temperature and high-humidity environment after storage in a harsh environment.

(1-1) The amount of trimethylsilanol in the silica fine particles including polydimethylsiloxane is small, and the toner particle surface is not likely to be compatible with the polydimethylsiloxane contained in the silica fine particles.

(1-2) A portion where the ester group concentration is higher than that at the toner particle surface and at the position at a depth of 100 nm from the toner particle surface is present in the region near the toner particle surface within 100 nm in depth from the toner particle surface. That is, the below-described standard value of an ion fragment of an ester group has one or more peaks, and the outmigration of hydrocarbon wax located inside the toner is suppressed.

The above (1-1) is strongly influenced by the composition of polydimethylsiloxane, which is a surface treatment agent for the silica fine particles, and the resin composition on the toner particle surface. The amount of trimethylsilanol contained in the silica fine particles is low, and the polydimethylsiloxane of the silica fine particles is unlikely to be compatible with the toner particle surface, so that the outmigration amount of hydrocarbon wax located inside the toner particle in storage in a harsh environment can be suppressed. Therefore, even when images are output for a long time in a high-temperature and high-humidity environment after storage in a harsh environment, toner aggregates are unlikely to occur.

Meanwhile, the above (1-2) is strongly affected by the resin composition near the toner particle surface and the orientation state of the resin. As a result of the standard value of the ion fragment of the ester group having one or more peaks near the toner particle surface, the outmigration of hydrocarbon wax located inside the toner particle in storage in a harsh environment can be suppressed due to the difference in polarity. In addition, the presence of the peak(s) means that the ester group concentration on the toner particle surface is lower than the ester group concentration in the region inside the toner particle at 100 nm from the toner particle surface. Therefore, the effect of reducing the likelihood of compatibility between the polydimethylsiloxane of the silica fine particles and the toner particle surface described in (1-1) can be expected. For this reason, even when the image is output for a long time in a high-temperature and high-humidity environment after storage in a harsh environment, toner aggregates are unlikely to occur.

As described above, by satisfying the (1-1) and (1-2), it is possible for the first time to suppress the adverse effect on images caused by toner aggregates even when the images are output for a long time in a high-temperature and high-humidity environment after storage in a harsh environment.

Specifically, in order to make the toner surface unlikely to be compatible with the silica fine articles, the inorganic fine particles include silica fine particles surface-treated with the polydimethylsiloxane represented by the formula (A) and the polydimethylsiloxane represented by the formula (B). For example, it is considered that as a result of surface-treating the silica fine particles with the polydimethylsiloxanes, the polydimethylsiloxanes are bound to the silica fine particles and/or the polydimethylsiloxanes are physically adsorbed on the silica fine particles.

Since the silica fine particles are treated with the above two types of polydimethylsiloxanes, the amount of trimethylsilanol in the silica fine particles can be reduced while the immobilization rate of the polydimethylsiloxane remains higher than that of the silica fine particles treated with only the polydimethylsiloxane represented by the formula (A). It is considered that this is because the polydimethylsiloxane represented by the formula (B) has high reactivity with the silica fine particles. This can reduce the likelihood of the polydimethylsiloxane in the silica fine particles being compatible with the toner particle surface.

Further, the polydimethylsiloxane represented by the formula (A) does not have a reactive functional group and is, therefore, lower in polarity than the polydimethylsiloxane represented by the formula (B) and is unlikely to be compatible with the toner particle surface having high polarity. Therefore, by using the polydimethylsiloxane represented by the formula (A) and the polydimethylsiloxane represented by the formula (B) in combination, the generation of trimethylsilanol can be suppressed and the polarity of the polydimethylsiloxane itself in the silica fine particles can be reduced. This can reduce the likelihood of the polydimethylsiloxane in the silica fine particles being compatible with the toner particle surface having high polarity.

Since the polydimethylsiloxane of silica fine particles is unlikely to be compatible with the toner particle surface, the shielding property of the toner particle surface against hydrocarbon wax can be maintained. As a result, the hydrocarbon wax present inside the toner particle is unlikely to out-migrate, so that toner aggregates are unlikely to occur even in storage in a harsh environment.

Furthermore, in the organic volatile component analysis of silica fine particles at a heating temperature of 150° C. by the headspace method, the total amount of trimethylsilanol in terms of octamethyltrisiloxane based on the mass of the silica fine particles needs to be from 1.0 ppm to 5.0 ppm.

The amount of trimethylsilanol in the silica fine particles in the above range means that the amount of trimethylsilanol separated from the polydimethylsiloxane contained in the silica fine particles is small. Therefore, by controlling the amount of trimethylsilanol in the silica fine particles within the above range, the polarity of the polydimethylsiloxane can be lowered, and the likelihood of the polydimethylsiloxane and the toner particle surface being compatible with each other can be reduced. Therefore, the hydrocarbon wax located inside the toner particle is unlikely to out-migrate and toner aggregates are unlikely to occur even in storage in a harsh environment. As a result, the adverse effect on images caused by toner aggregates can be suppressed even when the toner is used for a long time in a high temperature and high humidity environment after storage in a harsh environment.

The total amount of trimethylsilanol in terms of octamethyltrisiloxane based on the mass of the silica fine particles in the silica fine particles is preferably from 1.1 ppm to 3.0 ppm, and more preferably from 1.2 ppm to 2.5 ppm. The total amount of trimethylsilanol in the silica fine particles can be controlled by the type of the treatment agent used for hydrophobizing the surface of the silica fine particles, the amount of the treatment agent, and the particle diameter of the silica fine particles.

When the total amount of trimethylsilanol in the silica fine particles is less than 1.0 ppm, it indicates that the number of parts treated with the polydimethylsiloxane is too small, or that the polydimethylsiloxane in the silica fine particles is the polydimethylsiloxane represented by the formula (B). Since the polydimethylsiloxane represented by the formula (B) has a reactive functional group at the end or in the side chain, the reactivity with the silica base is high, and the amount of polydimethylsiloxane transferred when the silica fine particles come into contact with various members decreases. Here, the polydimethylsiloxane contained in the silica fine particles reduces the adhesive force between the toner and the various members as a result of a part of the polydimethylsiloxane being transferred from the toner to the various members at the time of contact with the various members.

However, if the number of parts treated with polydimethylsiloxane is too small or only the highly reactive polydimethylsiloxane represented by the formula (B) is used, the amount of polydimethylsiloxane transferred when the silica fine particles come into contact with the various members decreases. Therefore, the adhesive force between the toner and the various members increases. As a result, toner aggregates are likely to occur when the toner is used for a long time in a high-temperature and high-humidity environment after storage in a harsh environment. In the case of a one-component developer, the generated toner aggregates stay in a rubbing region between a toner bearing member and a charge-providing member, thereby adversely affecting an image (vertical streaks in a halftone image).

Further, when the total amount of trimethylsilanol in the silica fine particles is larger than 5.0 ppm, the polydimethylsiloxane in the silica fine particles becomes polar, so that the polydimethylsiloxane and the toner particle surface are likely to be compatible with each other. As a result, since the toner particle surface has polarity, the shielding effect of suppressing the outmigration of hydrocarbon wax located inside the toner is reduced, and the hydrocarbon wax located inside the toner particles is likely to out-migrate in storage in a harsh environment.

Where a value obtained by dividing an amount of ions of the structure represented by the following formula (C) measured from the surface of the toner particle to a depth of 100 nm by time-of-flight secondary ion mass spectrometry, by the total amount of counted ions is taken as a standard value, it is necessary that at least one peak of the standard value be present within a range of 100 nm from the toner particle surface. Where the maximum value among the at least one peak of the standard value is denoted by A(d max) and the standard value on the toner particle surface (that is, the depth is 0 nm) is denoted by A(0), the following formulas (1) and (2) are satisfied.

$$1.05 \leq A(dmax)/A(0) \leq 5.00 \quad (1)$$

$$A(0) \geq 0.010 \quad (2)$$

(C)

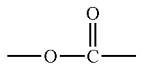

By performing control so as to satisfy the formula (1) near the toner particle surface (the region from the toner particle surface to a depth of 100 nm), it is possible to ensure the presence of an ester group in a certain or greater amount on the inside relative to the toner particle surface. That is, it means that slightly on the inside relative to the toner particle surface, a highly polar polyester resin is present in an amount larger than that on the toner particle surface, and the outmigration of hydrocarbon wax located inside the toner can be suppressed even in storage in a harsh environment.

Further, the formula (2) indicates that the ester group concentration on the toner particle surface (depth 0 m) is above a certain level. As a result of performing control to satisfy the formula (1) and also so that the ester group concentration satisfies the formula (2) near the toner particle surface, a peak of the ester group concentration is present near the toner particle surface, and the magnitude of the peak can be made above a certain level while reducing the concentration of ester groups present on the toner particle surface.

By reducing the concentration of ester groups present on the toner particle surface, the likelihood of the silica fine particles and the toner particle surface being compatible with each other can be reduced even when the silica fine particles include trimethylsilanol. Further, when the peak of ester group concentration is larger than a certain level near the toner particle surface, the difference in polarity between the vicinity of the toner particle surface and the hydrocarbon wax becomes large, and it is possible to suppress the outmigration of hydrocarbon wax located inside the toner to the toner particle surface. As a result, the adverse effect on images caused by toner aggregates can be suppressed even when the toner is used for a long time in a high-humidity environment after storage in a harsh environment.

A(d max)/A(0) represented by the formula (1) is preferably from 1.08 to 2.00, and more preferably from 1.15 to 1.50. When A(d max)/A(0) is less than 1.05, it means that the ester group concentration at a depth of from 0 to 100 nm is not much higher than the ester group concentration on the toner particle surface. Therefore, in storage in a harsh environment, the outmigration of hydrocarbon wax located inside the toner cannot be suppressed and toner aggregates are likely to occur.

Further, when A(d max)/A(0) is larger than 5.00, it means that the ester groups are excessively unevenly distributed in the resin on the inside relative to the toner particle surface. In order to achieve the above range, it is necessary to use a resin having extremely high or low physical properties such as molecular weight and acid value, and the variation in ester group concentration among the toner particles is likely to be large. As a result, in storage in a harsh environment, a toner is present in which the outmigration of the hydrocarbon wax located inside the toner cannot be suppressed and toner aggregates are likely to occur. A(d max)/A(0) can be controlled by the high-temperature and high-pH treatment step described hereinbelow and the composition of polar resin on the toner particle surface.

Regarding the formula (2), in a toner including a polyester resin within a depth of 100 nm from the toner particle surface and satisfying the formula (1), a certain amount of the structure represented by the formula (C) can be present on the toner particle surface (depth 0 nm). Therefore, it is considered difficult to produce a toner having A(0) of less than 0.010.

A(0) is preferably 0.020 or more, more preferably 0.030 or more, and further preferably 0.040 or more. The upper limit is not particularly limited, but is preferably 0.100 or less, more preferably 0.080 or less, and further preferably 0.074 or less. A(0) can be controlled by the high-temperature and high-pH treatment step described hereinbelow and the composition of polar resin on the toner particle surface.

A(d max) is preferably 0.040 or more, and more preferably 0.050 or more. The upper limit is not particularly limited, but is preferably 0.200 or less, more preferably 0.120 or less, and further preferably 0.100 or less.

Where a value obtained by dividing an amount of ions of the structure represented by the formula (C) measured from the surface of the toner particle to a depth of 100 nm by time-of-flight secondary ion mass spectrometry, by a total amount of counted ions is taken as a standard value, and the standard value at a position at a depth of 100 nm from the surface of the toner particle is denoted by A(100), a following formula (3) is satisfied.

$$1.05 \leq A(d\ max)/A(100) \leq 5.00 \quad (3)$$

Satisfying the formula (3) means that the ester group concentration in a region closer to the toner particle surface is higher by a certain or larger value than the ester group concentration at a depth of 100 nm from the toner particle surface, that is, the ester group concentration of the resin in the region where the hydrocarbon wax located inside the toner particles is present. As a result of the ester group concentration near the toner particle surface being higher by a certain or larger value that the ester group concentration inside the toner particles, the hydrocarbon wax located inside the toner particle tends to stay inside the toner particle due to the difference in polarity.

Therefore, the outmigration of hydrocarbon wax located inside the toner particle to the toner surface can be suppressed. As a result, the adverse effect on images caused by toner aggregates can be suppressed even when the toner is used for a long time in a high-humidity environment after storage in a harsh environment. A(d max)/A(100) is more preferably 1.10 or more, still more preferably 1.20 or more. Meanwhile, the upper limit is more preferably 3.00 or less, and still more preferably 2.00 or less.

A(d max)/A(100) can be controlled by the high-temperature and high-pH treatment step described hereinbelow and the composition of polar resin on the toner particle surface. A(100) is preferably 0.030 or more, and more preferably 0.040 or more. The upper limit is not particularly limited, but is preferably 0.200 or less, more preferably 0.100 or less, and further preferably 0.080 or less.

The present inventors consider that the ester group represented by the above formula (C) can be unevenly distributed near the toner particle surface according to the following mechanism. Control can be carried out by creating a design in which the presence state of the structure represented by the formula (C) is also taken into account so as to obtain a specific composition distribution, for example, in which a monomer unit having a non-polar group and a monomer unit having a polar group are unevenly distributed in the polyester molecule.

As a specific method, the distribution of ester bond segments in the polyester resin can be controlled by aligning the orientation states of the carboxylic acid groups at the ends of the polyester resin, which is a polar resin, near the toner particle surface, or by using a combination of polymers with compositions having significantly different polar distributions. Further, for example, where the toner particles including the polyester resin having the structure represented by the formula (C) are treated in an aqueous medium with a pH and heat at or above a certain level, the ester bond segments in the polyester resin are likely to move to the toner particle surface. Meanwhile, it is considered that since the polyester resin including the structure represented by the formula (C) has the distribution of ester bond segments, the distribution also occurs in the orientation state, and the structure represented by the formula (C) can be unevenly distributed in the region within 100 nm in depth from the toner particle surface.

Silica Fine Particles

Hereinafter, silica fine particles will be described. As mentioned hereinabove, the silica fine particles are surface-treated with the polydimethylsiloxanes represented by the formulas (A) and (B). Further, the silica fine particles are preferably surface-treated with the polydimethylsiloxane represented by the formula (A) and the polydimethylsiloxane represented by the formula (D). That is, the polydimethylsiloxane represented by the formula (B) is preferably the polydimethylsiloxane represented by the formula (D).

(A)

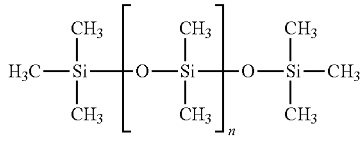

-continued (B)

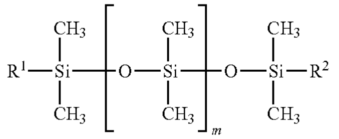

(D)

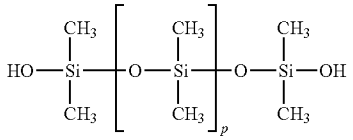

In the formulas, $R^1$ is a carbinol group, a hydroxy group, an epoxy group, a carboxy group, an alkyl group (having preferably from 1 to 6 carbon atoms and more preferably from 1 to 3 carbon atoms), or a hydrogen atom, and $R^2$ is a carbinol group, a hydroxy group, an epoxy group, a carboxy group, or a hydrogen atom. Preferably, $R^1$ and $R^2$ are each a carbinol group, a hydroxy group, or a hydrogen atom. Each methyl group of the side chains in the formula (B) may be substituted with a carbinol group, a hydroxy group, an epoxy group, a carboxy group, or a hydrogen atom. n, m and p are average numbers of repeating units, n is from 30 to 200 (preferably from 40 to 100 and more preferably from 50 to 80), m is from 30 to 200 (preferably from 40 to 100 and more preferably from 50 to 80), and p is from 30 to 200 (preferably from 40 to 100 and more preferably from 50 to 80).

By treating the silica fine particles with two types of polydimethylsiloxanes of the formulas (A) and (D), the amount of trimethylsilanol in the silica fine particles can be reduced with respect to that in the silica fine particles treated with the polydimethylsiloxane represented by the formulas (A) and (B). This is due to the high reactivity of the polydimethylsiloxane represented by the formula (D) with the silica base. For this reason, the polydimethylsiloxane of the silica fine particles and the toner surface are unlikely to be compatible with each other. As a result, toner aggregates are unlikely to occur even when the toner is used for a long time in a high-temperature and high-humidity environment after storage in a harsh environment.

The number average particle diameter of the primary particles of the silica fine particles is preferably from 5 nm to 30 nm, and more preferably from 6 nm to 12 nm. By controlling the number average particle diameter of primary particles of the silica fine particles within the above range, the flowability of the toner can be significantly improved when the silica fine particles are added. As a result, the adverse effect on the image caused by tonner aggregates can be suppressed even when the toner is used for a long time in a high-temperature and high-humidity environment after storage in a harsh environment.

Examples of the raw silica fine particles include dry silica which is called fumed silica and is produced by vapor phase oxidation of a silicon-containing halide, and wet silica produced from water glass or the like. Dry silica, which has few silanol groups on the surface and inside and has no production residue, is preferable.

The polydimethylsiloxanes represented by the formulas (A), (B) and (D) are preferably highly volatile so that they can be efficiently evaporated and removed by the surface treatment described hereinbelow. Therefore, the polydimethylsiloxanes preferably have a relatively small molecular weight.

The molecular weight of the polydimethylsiloxanes represented by the formulas (A), (B) and (D) is, for example, preferably from 250 to 50000, more preferably from 250 to 10000, and still more preferably from 250 to 5000, as a number average molecular weight. When the molecular weight of the polydimethylsiloxanes is 50000 or less, the volatility is appropriate, and the polydimethylsiloxanes are easily evaporated and removed by the surface treatment described hereinbelow to enable easy reaction with the silica base. Meanwhile, when the molecular weight of the polydimethylsiloxanes is 250 or more, it becomes easy to impart high hydrophobicity.

From the viewpoint of uniform treatment, it is preferable that the polydimethylsiloxanes represented by the formulas (A), (B) and (D) be used for surface treatment after being diluted to, for example, about 5% by mass to 50% by mass with an appropriate solvent. Examples of the solvent include hexane, toluene, alcohols (aliphatic alcohols having from 1 to 8 carbon atoms such as methanol, ethanol, propanol, and the like), acetone and the like, water or a mixture of two or more thereof.

The amount of polydimethylsiloxane used for the surface treatment of silica fine particles varies depending on the type of silica base (specific surface area and the like) and the type of polydimethylsiloxane (molecular weight and the like), and is not particularly limited. Usually, the amount of polydimethylsiloxane is preferably from 1 part by mass to 40 parts by mass, more preferably from 2 parts by mass to 35 parts by mass, and further preferably from 5 parts by mass to 30 parts by mass with respect to 100 parts by mass of silica fine particles. When the amount of the polydimethylsiloxane used is at or above the lower limit, sufficient surface treatment can be performed and silica fine particles having a high hydrophobicity can be obtained. Meanwhile, when the polydimethylsiloxane is used at or below the upper limit, the hydrophobicity of the silica fine particles can be increased and aggregation is unlikely to occur.

The amount of the polydimethylsiloxane represented by the formula (A) which is to be used for the surface treatment is preferably from 3 parts by mass to 40 parts by mass, more preferably from 5 parts by mass to 35 parts by mass, and further preferably from 10 parts by mass to 30 parts by mass with respect to 100 parts by mass of the silica fine particles before the surface treatment. The amount of the polydimethylsiloxane represented by the formula (B) which is to be used for the surface treatment is preferably from 1 parts by mass to 35 parts by mass, more preferably from 2 parts by mass to 30 parts by mass, and further preferably from 5 parts by mass to 20 parts by mass with respect to 100 parts by mass of the silica fine particles before the surface treatment.

The mass ratio (B)/(A) of the polydimethylsiloxane represented by the formula (B) to the polydimethylsiloxane represented by the formula (A) in the surface treatment is preferably from 0.05 to 10.00, and more preferably from 0.06 to 6.00, and even more preferably from 0.20 to 1.00.

Surface Treatment Method

The surface treatment method is preferably carried out in an inactive gas atmosphere such as a nitrogen atmosphere in order to prevent hydrolysis and oxidation. Specifically, a method can be adopted in which the silica base is placed in a container equipped with a stirring device such as a Henschel mixer and stirred under a nitrogen purge, and a diluted solution of polydimethylsiloxane is sprayed and mixed with the silica substance, followed by heating and reacting. The spraying may be performed prior to heating, or may be performed while heating to the treatment temperature or a temperature lower than the treatment temperature.

Treatment Conditions

In the surface treatment, the abovementioned predetermined amount of polydimethylsiloxane is applied to the silica base and heated under stirring to react and immobilize the polydimethylsiloxane on the surface of the silica base. Here, the polydimethylsiloxane may be diluted with the abovementioned various solvents and then applied to the silica base.

The heating temperature in this surface treatment varies depending on the reactivity of the polydimethylsiloxane used and the like, but is preferably from 150° C. to 380° C., and more preferably from 250° C. to 350° C. The treatment time varies depending on the heating temperature and the reactivity of the polydimethylsiloxane used, but is preferably from 5 min to 300 min, more preferably from 50 min to 200 min, and even more preferably from 80 min to 160 min.

At the aforementioned treatment temperature and treatment time of the surface treatment, the polydimethylsiloxane can sufficiently react with the silica base, and the hydrophobicity of the silica fine particles is improved. In addition, the production efficiency is also improved.

It is preferable that the silica fine particles be treated by hydrophobizing the silica base by using the polydimethylsiloxane represented by the formula (A), which is excellent in ability to hydrophobize the silica base, and then treating with the polydimethylsiloxane represented by the formula (B) or (D). By treating in the above treatment order, the amount of trimethylsilanol remaining in the silica fine particles can be reduced, and silica fine particles having a high hydrophobicity can be obtained.

From the viewpoint of improving flowability and charging performance, the amount of the silica fine particles is preferably from 0.1 part by mass to 4.0 parts by mass, more preferably from 0.2 parts by mass to 3.5 parts by mass, and even more preferably from 0.7 parts by mass to 1.5 parts by mass with respect to 100 parts by mass of the toner particles. The toner may have inorganic fine particles other than the above-described silica fine particles on the toner particle surface. Examples of the inorganic fine particles include titanium oxide particles, alumina particles, and particles of double oxides thereof.

Binder Resin

The toner particle includes a binder resin. The binder resin is not particularly limited, and known ones can be used. For example, the following resins can be mentioned. Vinyl resins, polyester resins, polyol resins, polyvinyl chloride resins, phenol resins, phenol resins modified with a natural resin, maleic acid resins modified with a natural resin, acrylic resins, methacrylic resins, polyvinyl acetate, silicone resins, polyurethane resins, polyamide resins, furan resins, epoxy resins, xylene resins, polyvinyl butyral, terpene resins, coumarone indene resins, petroleum resins. Vinyl resins, polyester resins, and hybrid resins in which a polyester resin and a vinyl resin are mixed or partially reacted are preferable.

Polyester Resin

The binder resin preferably includes a polyester resin. The polyester resin will be described hereinbelow. The polyester resin is not particularly limited, but is preferably an amorphous polyester resin, and examples thereof include the following.

Examples of the divalent acid component include the following dicarboxylic acids or derivatives thereof. Benzenedicarboxylic acids such as phthalic acid, terephthalic acid, isophthalic acid, and phthalic anhydride, or anhydrides or lower alkyl esters thereof; alkyldicarboxylic acids such as succinic acid, adipic acid, sebacic acid, and azelaic acid, or anhydrides or lower alkyl esters thereof; alkenyl succinic acids or alkyl succinic acids such as n-dodecenyl succinic acid, n-dodecyl succinic acid, or anhydrides or lower alkyl esters thereof and unsaturated dicarboxylic acids such as fumaric acid, maleic acid, citraconic acid, itaconic acid, or anhydrides or lower alkyl esters thereof.

Examples of the dihydric alcohol component include the following. Ethylene glycol, polyethylene glycol, 1,2-propanediol, 1,3-propanediol, 1,6-hexanediol, neopentyl glycol, 1,4-cyclohexanedimethanol (CHDM), hydrogenated bisphenol A, bisphenol and derivatives thereof.

In addition to the abovementioned divalent carboxylic acid compound and dihydric alcohol compound, the polyester resin may include a monovalent carboxylic acid compound, a monohydric alcohol compound, a trivalent or higher carboxylic acid compound, and a trihydric or higher alcohol compound as constituent components.

Examples of the monovalent carboxylic acid compound include aromatic carboxylic acids having 30 or less carbon atoms such as benzoic acid, p-methylbenzoic acid, and the like; and aliphatic carboxylic acids having 30 or less carbon atoms such as stearic acid, behenic acid, and the like. Examples of the monohydric alcohol compound include aromatic alcohols having 30 or less carbon atoms such as benzyl alcohol and the like, and aliphatic alcohols having 30 or less carbon atoms such as lauryl alcohol, cetyl alcohol, stearyl alcohol, behenyl alcohol, and the like.

The trivalent or higher carboxylic acid compound is not particularly limited, and examples thereof include trimellitic acid, trimellitic anhydride, pyromellitic acid, and the like. Examples of the trihydric or higher alcohol compound include trimethylolpropane, pentaerythritol, glycerin, and the like.

The polyester resin preferably includes a monomer unit represented by a following formula (E), a monomer unit represented by a formula (F), and a monomer unit represented by a formula (G). The monomer unit refers to a form in which a monomer substance in a polymer has reacted. The content ratio of the monomer unit represented by the formula (E) in the polyester resin is preferably from 30% by mass to 50% by mass, and more preferably from 40% by mass to 50% by mass. The content ratio of the monomer unit represented by the formula (F) in the polyester resin is preferably from 25% by mass to 50% by mass, and more preferably from 30% by mass to 45% by mass. The content ratio of the monomer unit represented by the formula (G) in the polyester resin is preferably from 0.4% by mass to 50% by mass, more preferably from 1% by mass to 30% by mass, and even more preferably from 6% by mass to 25% by mass.

In the formulas, $R^3$ represents a benzene ring, preferably bonded at the para position. Each $R^4$ represents an ethylene group or a propylene group, x and y are integers of 1 or more, and the average value of x+y is from 2 to 10. $R^5$ represents an ethylene group or a propylene group, and is preferably an ethylene group.

(E)

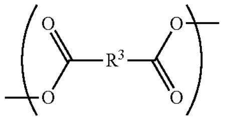

-continued (F)

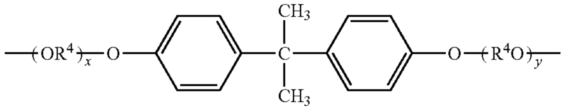

(G)

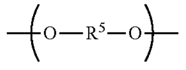

The present inventors consider that by controlling the content ratio of the monomer units in the polyester resin within the above range, the concentration of ester group of the polyester resin can be easily increased and the orientation state of the carboxylic acid group at the polymer end can be easily aligned. That is, since the polyester resin in which the content ratio of the monomer units is controlled within the above ranges includes a certain amount of the monomer units represented by the formula (G) and having a low molecular weight, the concentration of ester groups in the polyester resin can be increased. Further, since a certain amount of the monomer unit represented by the formula (G) and having a low molecular weight is contained, the flexibility can be enhanced. The present inventors consider that by increasing the concentration of ester groups in the polyester resin and increasing the flexibility of the polyester resin, it becomes easy to align the orientation state of the carboxylic acid groups at the polymer ends by using the polarity of the ester groups.

As a result, the concentration of ester groups near the toner particle surface can be easily controlled within the ranges of the formulas (1) and (2), the adverse effect on images caused by toner aggregates can be suppressed even when the toner is used for a long time in a high humidity environment after storage in a harsh environment.

The polyester resin preferably includes a monomer unit represented by a following formula (H).

(H)

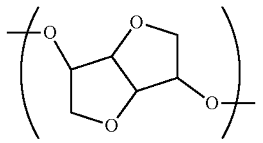

When the polyester resin includes a monomer unit obtained by polymerizing the isosorbide represented by the formula (H), the polarity of the polyester resin can be optimized, and the monomer units having a non-polar group and the monomer units having a polar group are likely to be unevenly distributed in the polyester resin.

The present inventors consider the reason for this as follows. Since the monomer unit represented by the formula (H) has an ether bond in the cyclic structure, the influence on the polarity of the ester group component per one monomer unit can be appropriately mitigated as compared with the monomer unit having an ether bond such as ethylene glycol. Further, since the monomer unit represented by the formula (H) has a cyclic structure in which oxygen atoms face outward, it becomes easier to distribute the polar groups unevenly by using the polarity derived from the cyclic structure as compared with a monomer unit including an alkyl chain in the main chain, such as ethylene glycol. The present inventors consider that this is why the polarity caused by the ester group component can be appropriately imparted to the polyester resin, and the alcohol monomer units having a polar group and represented by the formulas (G) and (H) and the alcohol monomer unit having a non-polar group and represented by the formula (F) can be unevenly distributed. As a result, the concentration of ester groups near the toner particle surface can be easily controlled within the ranges of the formulas (1) and (2), and the adverse effect on images caused by toner aggregates can be suppressed even when the toner is used for a long time in a high humidity environment after storage in a harsh environment.

The content ratio of the monomer unit represented by the formula (H) in the polyester resin is preferably from 1.0% by mass to 4.0% by mass, and more preferably from 2.0% by mass to 3.5% by mass.

The weight average molecular weight of the polyester resin is preferably from 6000 to 20000, and more preferably from 9000 to 15000. The acid value of the polyester resin is preferably from 3.0 mg KOH/g to 15.0 mg KOH/g, and more preferably from 4.0 mg KOH/g to 10.0 mg KOH/g. The method for producing the polyester resin is not particularly limited, and a known method can be used.

Polymerizable Monomers

The binder resin may include a vinyl resin. As the polymerizable monomer capable of producing a vinyl resin, a vinyl monomer capable of radical polymerization is used. As the vinyl monomer, a monofunctional monomer or a polyfunctional monomer can be used.

Monofunctional monomers include styrene; styrene derivatives such as α-methylstyrene, β-methylstyrene, o-methylstyrene, m-methylstyrene, p-methyl styrene, p-methoxystyrene, and p-phenylstyrene; acrylic polymerizable monomers such as methyl acrylate, ethyl acrylate, n-propyl acrylate, iso-propyl acrylate, n-butyl acrylate, dibutyl phosphate ethyl acrylate, and 2-benzoyloxyethyl acrylate; methacrylic polymerizable monomers such as methyl methacrylate, ethyl methacrylate, and dibutyl phosphate ethyl methacrylate; methylene aliphatic monocarboxylic acid esters; vinyl esters such as vinyl acetate and vinyl propionate; vinyl ethers such as vinyl methyl ether, vinyl ethyl ether, and vinyl isobutyl ether; vinyl ketones such as vinyl methyl ketone, vinyl hexyl ketone, and vinyl isopropyl ketone.

Among the above, the present polymerizable monomer preferably includes styrene or a styrene derivative and an acrylic polymerizable monomer. That is, the binder resin preferably contains a styrene-acrylic resin. The styrene-acrylic resin is a polymer of monomers including at least one selected from the group consisting of styrene and a styrene derivative, and at least one selected from the group consisting of an acrylic polymerizable monomer and a methacrylic polymerizable monomer. The styrene-acrylic resin is preferably a polymer of monomers including styrene and at least one selected from the group consisting of an acrylic polymerizable monomer and a methacrylic polymerizable monomer.

Examples of the polyfunctional monomer include diethylene glycol diacrylate, triethylene glycol diacrylate, tetraethylene glycol diacrylate, polyethylene glycol diacrylate, tetramethylolmethane tetramethacrylate, divinylbenzene, divinyl ether, and the like.

It is also possible to use a crosslinking agent for the polymerizable monomers. Specifically, the following compounds having two or more polymerizable double bonds can be used. Carboxylic acid esters having two double bonds such as propylene glycol diacrylate, ethylene glycol diacrylate, 1,6-hexanediol diacrylate, and 1,3-butanediol dimethacrylate, aromatic divinyl compounds such as divinylbenzene and divinylnaphthalene, divinyl compounds such as divinylaniline, divinyl ether, divinyl sulfide, divinyl sulfone, and the like, and compounds having three or more vinyl groups. From the viewpoint of achieving both low-temperature fixability and high-temperature elasticity, it is preferable to use a carboxylic acid ester. These crosslinking agents can be used alone or in combination.

The amount of the crosslinking agent added is preferably from 0.01 part by mass to 5.00 parts by mass, and more preferably from 0.10 parts by mass to 3.00 parts by mass with respect to 100 parts by mass of the polymerizable monomers that produce the binder resin or the binder resin.

A polymerization initiator may be used in the production of toner particles as well. As the polymerization initiator, an oil-soluble initiator and/or a water-soluble initiator is used. A polymerization initiator preferably has a half-life at the reaction temperature during the polymerization reaction of from 0.5 h to 30 h. Further, it is preferable that the polymerization reaction be carried out with the polymerization initiator addition amount of from 0.5 parts by mass to 20 parts by mass with respect to 100 parts by mass of the polymerizable monomers because a polymer having a maximum value of molecular weight between 10,000 and 100,000 is usually obtained, and toner particles having suitable strength and melting characteristics can be obtained.

Examples of the polymerization initiator include the following: azo or diazo polymerization initiators such as 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile, azobisisobutyronitrile, and the like; peroxide polymerization initiators such as benzoyl peroxide, t-butyl peroxy-2-ethylhexanoate, t-butyl peroxypivalate, t-butyl peroxyisobutyrate, t-butyl peroxyneodecanoate, methyl ethyl ketone peroxide, diisopropyl peroxycarbonate, cumene hydroperoxide, 2,4-dichlorobenzoyl peroxide, lauroyl peroxide, and the like; and the like.

In order to control the degree of polymerization of the polymerizable monomers, it is also possible to further add and use known chain transfer agent, polymerization inhibitor, and the like.

Core-Shell Structure

The toner particle preferably has a core-shell structure having a core particle and a shell on the core particle surface. It is preferable that the core particle include a styrene-acrylic resin and the shell include a polyester resin. Since the toner particle has a core-shell structure having the abovementioned configuration, the hydrocarbon wax contained inside the toner particle is unlikely to out-migrate to the toner particle surface. This is because the hydrocarbon wax has a higher affinity with the styrene-acrylic resin of the core particle than with the polyester resin of the shell, so even in storage in a harsh environment, the hydrocarbon wax located inside the toner is likely to remain in the styrene-acrylic resin of the core particle. As a result, the adverse effect on images caused by toner aggregates can be suppressed even when the toner is used for a long time in a high-humidity environment after storage in a harsh environment.

In the cross-sectional observation of the toner with a transmission electron microscope, the average value of the shell thickness is preferably from 100 nm to 200 nm, and more preferably from 105 nm to 160 nm. When the thickness of the shell of the toner particle is within the above range, the polyester resin contained in the shell can further suppress the outmigration of the hydrocarbon wax. As a result, the adverse effect on images caused by toner aggregates can be suppressed even when the toner is used for a long time in a high-humidity environment after storage in a harsh environment.

It is also preferable that the toner have the following configuration.

A toner comprising:

a toner particle comprising a styrene-acrylic resin, a polyester resin and a hydrocarbon wax; and an inorganic fine particle, wherein the inorganic fine particle comprises a silica fine particle surface-treated with a polydimethylsiloxane represented by the formula (A) and a polydimethylsiloxane represented by the formula (B);

the toner particle comprises a core particle, and a shell on a surface of the core particle;

the core particle comprises the styrene-acrylic resin;

the shell comprises the polyester resin;

an average value of the thickness of the shell in cross-sectional observation of the toner with a transmission electron microscope is 100 to 200 nm;

where, in a measurement of the toner particle by time-of-flight secondary ion mass spectrometry measured from the surface of the toner particle to a depth of 100 nm, a value obtained by dividing an amount of ions of a structure represented by the formula (C) by a total amount of counted ions is taken as a standard value, at least one peak of the standard value is present within a range of 100 nm from the surface of the toner particle;

where the maximum value among the at least one peak of the standard value is denoted by A(d max), and the standard value on the toner particle surface is denoted by A(0), the A(d max) and the A(0) satisfy following formulas (1) and (2):

$$1.05 \leq A(d\ \max)/A(0) \leq 5.00 \quad (1)$$

$$A(0) \geq 0.010 \quad (2).$$

Hydrocarbon Wax

The hydrocarbon wax is preferably an aliphatic hydrocarbon wax. For example, low-molecular-weight polyethylene, low-molecular-weight polypropylene, microcrystalline wax, Fischer-Tropsch wax, paraffin wax, polyolefin wax, and the like. These waxes may be used alone or in combination of two or more.

An antioxidant may be added to these hydrocarbon waxes as long as the above effects are not impaired. The amount of the hydrocarbon wax is preferably from 1.0 part by mass to 30.0 parts by mass, and more preferably from 5.0 parts by mass to 15.0 parts by mass with respect to 100.0 parts by mass of the binder resin. The melting point of the hydrocarbon wax is preferably from 30° C. to 120° C., and more preferably from 60° C. to 100° C.

Colorant

As the colorant, known pigments and dyes can be used. Pigments are preferable as the colorant from the viewpoint of excellent weather resistance. Examples of cyanide colorants include copper phthalocyanine compounds and derivatives thereof, anthraquinone compounds, basic dye lake compounds, and the like. Specifically, the following can be mentioned. C. I. Pigment Blue 1, 7, 15, 15:1, 15:2, 15:3, 15:4, 60, 62 and 66.

Examples of magenta colorants include condensed azo compounds, diketopyrrolopyrrole compounds, anthraquinone compounds, quinacridone compounds, basic dye lake compounds, naphthol compounds, benzimidazolone compounds, thioindigo compounds, perylene compounds, and the like. Specifically, the following can be mentioned. C. I. Pigment Red 2, 3, 5, 6, 7, 23, 48:2, 48:3, 48:4, 57:1, 81:1, 122, 144, 146, 150, 166, 169, 177, 184, 185, 202, 206, 220, 221 and 254, and C. I. Pigment Violet 19.

Examples of yellow colorants include condensed azo compounds, isoindolinone compounds, anthraquinone compounds, azo metal complexes, methine compounds and allylamide compounds. Specifically, the following can be mentioned. C. I. Pigment Yellow 12, 13, 14, 15, 17, 62, 74, 83, 93, 94, 95, 97, 109, 110, 111, 120, 127, 128, 129, 147, 151, 154, 155, 168, 174, 175, 176, 180, 181, 185, 191, and 194.

Examples of black colorants include carbon black and those colored black using the abovementioned yellow colorant, magenta colorant, and cyan colorant. These colorants may be used alone or as a mixture of two or more. Furthermore, these can be used in the state of a solid solution. The amount of the colorant is preferably from 1.0 part by mass to 20.0 parts by mass with respect to 100.0 parts by mass of the binder resin.

Method for Manufacturing Toner Particles

Any known production method such as a dry method, an emulsion polymerization method, a dissolution suspension method, a suspension polymerization method, and the like can be used to produce the toner particles. In order to control the presence state of the compound of formula (C) near the toner particle surface in a specific range, it is preferable to perform the following treatment step.

It is preferable that method for manufacturing the toner particle includes a treatment step of treating a toner particle dispersion, in which the toner particles obtained by any of the production methods are dispersed in an aqueous medium, with a pH(1) and then with a pH(2), at a temperature of 90° C. or higher.

The pH(1) and pH(2) preferably satisfy the following formulas (4) and (5). (Hereinafter referred to as a high-temperature and high-pH treatment step).

$$pH(1) < pH(2) \quad (4)$$

$$5.5 \leq pH(2) \leq 11.0 \quad (5)$$

It is considered that with the high-temperature and high-pH treatment step, the terminal carboxylic acid contained in the polyester resin can be oriented toward the surface side of the toner particle and the ester bond segments can be unevenly distributed near the toner particle surface. Therefore, the orientation state of the compound of the formula (C) can be controlled more precisely, and uneven distribution at a depth of 100 nm or less from the toner particle surface is facilitated. In addition, the selectivity of materials such as polyester resin is improved.

The temperature is preferably 95° C. or higher. The upper limit is not particularly limited, and is preferably 110° C. or lower, 105° C. or lower, and 100° C. or lower. By performing the treatment within the above pH range at a high temperature of 90° C. or higher, the orientation state of molecules in the polyester resin can be easily moved. By making the pH(2) higher than the pH(1) in the formula (5), the orientation state of the polyester resin immobilized in the obtained toner particles can be easily changed.

Specifically, when the pH(2) is 5.5 or higher in the formula (5), the carboxylic acid at the end of the polyester resin is likely to undergo acid dissociation, so that the carboxylic acid at the end of the polyester resin is likely to face selectively the toner particle surface side, and the orientation state is likely to be controlled more precisely. Further, by setting the pH(2) to 11.0 or less, the generation of bubbles that easily cause the formation of coarse particles is suppressed, and the production can be free of quality concerns such as the generation of fogging due to poor charging caused by the generated coarse particles.

The pH(2) is more preferably from 6.0 to 10.5. Further, the pH(1) is preferably at least 3.0 and less than 5.5, and more preferably at least 4.5 and less than 6.0. The treatment time at pH(1) is preferably about 5 min to 6 h, and more preferably about 30 min to 3 h. The treatment time at pH(2) is preferably about 1 min to 120 min, and more preferably about 10 min to 60 min.

When toner particles are produced in an aqueous medium as in the suspension polymerization method or the emulsion aggregation method, a suspension in which the toner particles are dispersed in the aqueous medium can be obtained. Therefore, it is preferable to use the suspension to perform the high-temperature and high pH treatment. When toner particles are produced by a dry method such as a pulverization method, it is preferable that the obtained toner particles be reslurried to obtain a suspension, which is then subjected to the abovementioned high-temperature and high-pH treatment step.

It is preferable that the toner particle production be performed by a suspension polymerization method in which a polymerizable monomer composition is granulated in an aqueous medium to form particles of the polymerizable monomer composition. The method for producing the toner particles includes a granulation step of forming particles of a polymerizable monomer composition including polymerizable monomers, a hydrocarbon wax and a polyester resin in an aqueous medium, and a polymerization step of obtaining toner particles by polymerizing the polymerizable monomers contained in the particles of the polymerizable monomer composition. After the polymerization step, it is preferable to perform a high-temperature and high-pH treatment step on the obtained toner particles. Toner particles can be obtained by using known methods to filter, wash, and dry the toner particles obtained as described above.

Hereinafter, a method for producing toner particles by a pulverization method will be explained in detail by way of an example. An example for producing the toner particles by the pulverization method is presented hereinbelow.

In a raw material mixing step, a binder resin, a hydrocarbon wax, and optionally other additives are weighed in predetermined amounts and mixed as materials constituting the toner particles. Examples of the mixing device include a double-cone mixer, a V-type mixer, a drum-type mixer, a Super mixer, an FM mixer, a Nauta mixer, MechanoHybrid (manufactured by Nippon Coke Industries, Ltd.), and the like.

Next, the mixed materials are melt-kneaded to disperse the hydrocarbon wax and the like in the binder resin. In the melt-kneading step, a batch-type kneader such as a pressure kneader or a Banbury mixer, or a continuous kneader can be used. Single-screw or twin-screw extruders have become the mainstream because of their superiority in continuous production. Examples thereof include a KTK type twin-screw extruder (manufactured by Kobe Steel, Ltd.), a TEM type twin-screw extruder (manufactured by Toshiba Machine Co., Ltd.), a PCM kneader (manufactured by Ikegai Corp.), a twin-screw extruder (manufactured by KCK Engineering Co.), a co-kneader (manufactured by Buss AG), Kneadex (manufactured by Nippon Coke Industries Co., Ltd.), and the like. Further, the resin composition obtained by melt-kneading may be rolled with two rolls or the like and cooled with water or the like in a cooling step.

Then, the cooled product of the resin composition is pulverized to a desired particle diameter in the pulverization step. In the pulverization step, after coarse pulverization with a pulverizer such as a crusher, a hammer mill, or a feather mill, fine pulverization is further performed, for example, with Cryptron System (manufactured by Kawasaki Heavy Industries, Ltd.), Super Rotor (manufactured by Nisshin Engineering Co., Ltd.), a turbo mill (manufactured by Freund-Turbo Corporation), or a fine pulverizer based on an air jet method.

After that, if necessary, classification is performed with a classifier or a sieving machine such as Elbow Jet of an inertial classification system (manufactured by Nittetsu Mining Co., Ltd.), Turboplex of a centrifugal force classification system (manufactured by Hosokawa Micron Corporation), a TSP separator (manufactured by Hosokawa Micron Corporation), and Faculty (manufactured by Hosokawa Micron Corporation) to obtain toner particles.

It is preferable that the obtained toner particles be reslurried and subjected to the aforementioned high-temperature and high-pH treatment. Then, the toner particles can be obtained by filtering, washing and drying by a known method.

Hereinafter, a method for producing toner particles by the emulsification and aggregation method will be explained in detail by way of an example.

Binder Resin Particle-Dispersed Solution Preparation Process

A binder resin particle-dispersed solution is prepared, for example, in the following manner. When the binder resin is a homopolymer or copolymer (vinyl resin) of a vinyl monomer, the vinyl monomer is subjected to emulsion polymerization, seed polymerization, or the like in an ionic surfactant to prepare a dispersion liquid in which vinyl resin particles are dispersed in the ionic surfactant.

When the binder resin is a resin other than a vinyl resin, such as a polyester resin, the resin is mixed with an aqueous medium in which an ionic surfactant or a polyelectrolyte is dissolved. After that, this solution is heated above the melting point or softening point of the resin to dissolve the resin, and a dispersion liquid in which the binder resin particles are dispersed in an ionic surfactant is prepared using a disperser having a strong shearing force such as a homogenizer.

A means for dispersing is not particularly limited, and examples thereof include devices known as dispersers such as ball mills, sand mills, and dyno mills having a rotary shear homogenizer and media, but a phase inversion emulsification method may be also used as a method for preparing a dispersion liquid. In the phase inversion emulsification method, the binder resin is dissolved in an organic solvent, a neutralizing agent or a dispersion stabilizer is added as necessary, an aqueous solvent is added dropwise under stirring to obtain emulsified particles, and then the organic solvent in the resin-dispersed solution is removed to obtain an emulsion. At this time, the order of adding the neutralizing agent and the dispersion stabilizer may be changed.

In the emulsification and aggregation method, a colorant particle-dispersed solution can be used if necessary. The colorant particle-dispersed solution is formed by dispersing at least the colorant particles in a dispersant. In the emulsification and aggregation method, a wax particle-dispersed solution is used. The wax particle-dispersed solution is formed by dispersing at least a hydrocarbon wax in a dispersant.

Aggregation Step

An aggregation step in which aggregated particles are formed is a step of forming aggregated particles including binder resin particles, hydrocarbon wax particles, and colorant particles added as necessary in an aqueous medium including the binder resin particles, the hydrocarbon wax particles and, if necessary, the colorant particles.

Fusion Step

In a fusion step, the obtained aggregated particles are heated and fused. Before making a transition to the fusion step, a pH adjuster, a polar surfactant, a non-polar surfactant, and the like can be added, as appropriate, in order to prevent fusion between the toner particles.

The heating temperature may be equal to or higher than the glass transition temperature of the resin contained in the aggregated particles (the glass transition temperature of the resin having the highest glass transition temperature when there are two or more types of resin) and lower than the decomposition temperature of the resin. Therefore, the heating temperature varies depending on the type of resin of the binder resin particles and cannot be unconditionally defined, but is generally from the glass transition temperature of the resin contained in the aggregated particles to 140° C. The heating can be performed using a heating device/appliance known as such.

A short fusion time is sufficient if the heating temperature is high, and a long fusion time is required if the heating temperature is low. That is, the fusion time depends on the heating temperature and cannot be unconditionally defined, but is generally from 30 min to 10 h.

Toner particles can be obtained by performing the above-mentioned dispersion liquid preparation step, aggregation step, and fusion step. The obtained toner particles can be used as they are as toner particles to proceed to the next step such as filtration, washing, and drying by known methods. It is preferable to perform high-temperature and high-pH treatment on the obtained toner particles. Then, the toner particles can be obtained by filtering, washing and drying by known methods.

Toner can be obtained by externally adding inorganic fine particles including silica fine particles and mixing with the obtained toner particles by a known method. A known mixer such as FM mixer (manufactured by Nippon Coke Co., Ltd.) can be used for the external addition and mixing.

Various Measurement Methods

Various measurement methods are described hereinbelow.

Method for Measuring the Amount of Trimethylsilanol in Silica Fine Particles by Headspace Method The amount of trimethylsilanol in the silica fine particles is measured using silica fine particles separated from the toner.

Method for Separating Silica Fine Particles from Toner Surface

When silica fine particles separated from the surface of the toner are used as the measurement sample, the silica fine particles are separated from the toner by the following procedure. Further, toner particles excluding the external additive can also be obtained by the following separation method, and the obtained toner particles can be used for each measurement method.

The case of non-magnetic toner

A total of 160 g of sucrose (manufactured by Kishida Chemical Co., Ltd.) is added to 100 mL of ion-exchanged water and dissolved in a water bath to prepare a sucrose concentrate. A total of 31 g of the sucrose concentrate and 6 mL of Contaminone N (10% by mass aqueous solution of a neutral detergent for cleaning precision measuring instruments that is composed of a nonionic surfactant, an anionic surfactant, and an organic builder and has pH 7, manufactured by Wako Pure Chemical Industries, Ltd.) are placed in in a centrifuge tube to prepare a dispersion liquid. To this dispersion liquid, 1 g of toner is added, and toner lumps are loosened with a spatula or the like.

The centrifuge tube is set in "KM Shaker" (model: V.SX) manufactured by Iwaki Sangyo Co., Ltd., and the tube is shaken for 20 min under the condition of 350 reciprocations per min. After shaking, the solution is transferred to a glass tube (50 mL) for a swing rotor, and centrifugation is performed at 3500 rpm for 30 min with a centrifuge.

In the glass tube after centrifugation, toner particles are present in the uppermost layer, and silica fine particles are present on the aqueous solution side of the lower layer. The aqueous solution of the lower layer is collected, and centrifugation is repeated as necessary, and after sufficient separation, the dispersion liquid is dried and silica fine particles are collected. Further, the toner particles in the upper layer are collected, filtered, and washed with 2 L of ion-exchanged water warmed to 40° C., and the washed toner particles are taken out.

The Case of Magnetic Toner

A total of 6 mL of Contaminone N (10% by mass aqueous solution of a neutral detergent for cleaning precision measuring instruments that is composed of a nonionic surfactant, an anionic surfactant, and an organic builder and has pH 7, manufactured by Wako Pure Chemical Industries, Ltd.) is added to 100 mL of ion-exchanged water to prepare a dispersion medium. To this dispersion medium, 5 g of toner is added and dispersed with an ultrasonic disperser (VS-150, manufactured by AS ONE Corporation,) for 5 min. After that, the dispersion liquid is set in "KM Shaker" (model: V.SX) manufactured by Iwaki Sangyo Co., Ltd., and the dispersion liquid is shaken for 20 min under the condition of 350 reciprocations per min.

After that, the toner particles are restrained using a neodymium magnet. Since silica fine particles are present in the aqueous solution of the upper layer, the aqueous solution of the upper layer is collected, magnetic separation is repeated as necessary, and after sufficient separation, the dispersion liquid is dried to collect silica fine particles. In addition, the toner particles restrained using the neodymium magnet are collected. The toner particles are washed with 2 L of running ion-exchanged water warmed to 40° C., and the washed toner particles are taken out.

Measurement of the Amount of Trimethylsilanol in Silica Fine Particles

The amount of trimethylsilanol in the silica fine particles is obtained by analyzing the organic volatile components of the silica fine particles at a heating temperature of 150° C. by the headspace method, and calculating the concentration in terms of octamethyltrisiloxane based on the mass of the silica fine particles. The measurement conditions are shown below.

The measurement uses a multiple headspace extraction method. In the multiple headspace extraction method, a sample is accommodated in a closed container having a predetermined volume, the closed container is heated as necessary, and the gas phase in the closed container is drawn out (extracted). The measurement is performed using a headspace sampler HS40XL manufactured by PerkinElmer Japan Co., Ltd., and TRACE GC, TRACE MS (manufactured by Thermoquest Co., Ltd.) for GC/MS. The sample vial is connected to gas chromatography.

(i) Headspace Sampler Conditions

Sample amount: 500 mg

Sample temperature: 150° C.

Needle temperature: 150° C.

Transfer line temperature: 180° C.

Holding time: 60 min

Pressurization time: 0.25 min

Injection time: 0.08 min (ii) GC conditions

Column: HP5-MS (0.25 mm, 60 m)

Column temperature: holding at 40° C. for 3 min, raising the temperature at 2.0° C./min from 40° C. to 70° C., raising the temperature at 5.0° C./min from 70° C. and 150° C., and raising the temperature at 10.0° C./min from 150° C. to 300° C.

Split ratio 50:1

(iii) Equipment

A glass vial for headspace analysis manufactured by PerkinElmer Japan Co., Ltd. is used as the closed container.

(iv) Method (1) Preparation of Standard Sample

First, an acetone solution having an octamethyltrisiloxane concentration of 1000 ppm is prepared as a standard sample of trimethylsilanol, 5 μL of the solution is placed in a glass vial using a microsyringe having a volume of 10 μL, and the vial is quickly sealed with a septum for high temperature analysis.

(2) Preparation of Silica Fine Particle Sample

A total of 50 mg of silica fine particles is placed in a glass vial and sealed with a septum for high temperature analysis to prepare a sample.

(v) Analysis

A standard sample of octamethyltrisiloxane solution is measured using a quantitative multiple headspace extraction method to determine the total peak area per 0.005 μL of octamethyltrisiloxane (since GC sensitivity varies from day to day, the peak area per 0.005 μL of octamethyltrisiloxane needs to be investigated for each measurement). The gasified component is introduced into a mass spectrometer (mass analyzer), and it is confirmed that the obtained peak is a peak derived from octamethyltrisiloxane.

Next, silica fine particles are measured in the same manner as octamethyltrisiloxane and introduced into a mass spectrometer, the peak of trimethylsilanol is identified, and the total peak area is calculated. The amount of trimethylsilanol in the measurement sample is calculated from the peak area of the octamethyltrisiloxane standard sample by proportional calculation, and the amount of trimethylsilanol in the silica fine particles is obtained.

Method for Measuring Ion Amount (Secondary Ion Mass/Secondary Ion Charge Number (m/z)) by Time-of-Flight Secondary Ion Mass Spectrometry (TOF-SIMS)

For the concentration distribution of the functional group represented by the formula (C) on the toner particle surface, first, the structure represented by the formula (C) contained in the polar resin such as the polyester resin of the toner particle is identified. Next, using TOF-SIMS, the amount of ions of the acid component-based monomer units among the alcohol component-based monomer units and the acid component-based monomer units constituting the structures (ester bonds) represented by the formula (C) and contained in the polar resin is measured.

(1) Identification of the Structure Represented by the Formula (C) and Contained in the Polar Resin of Toner Particle Approximately 1.5 g of toner particles is precisely weighed (X1 [g]), placed in cylindrical filter paper (trade name: No. 86R, size 28×100 mm, manufactured by Advantech Toyo Co., Ltd.) that has been precisely weighed in advance, and set in a Soxhlet extractor.

Extraction is performed for 18 h using 200 mL of ethyl acetate as a solvent. At that time, the extraction is performed at a reflux rate such that the extraction cycle of the solvent is once every 5 min. After the extraction is completed, the extract is taken out and air-dried, and then vacuum-dried at 50° C. for 24 h. Since ethyl acetate has an ester group and has a high polarity, it is possible to extract a polar resin such as a polyester resin having an ester group in the same manner.

The composition analysis of the polar resin of the toner particle is performed from the NMR spectrum measurement.

Nuclear magnetic resonance spectroscopy ($^1$H-NMR) [400 MHz, $CDCl_3$, room temperature (25° C.)] is performed using the sample obtained by drying of the ethyl acetate extract. The analysis conditions are as follows.

Measuring device: FT NMR device JNM-EX400 (manufactured by JEOL Ltd.)

Measurement frequency: 400MHz

Pulse condition: 5.0 μs

Frequency range: 10500 Hz

Integration number: 64 times

From the NMR spectrum measured by the above method, the composition analysis of the polar resin is performed, and the structure represented by the formula (C) and contained in the polar resin is identified.

(2) Measurement of Amount of Ions Using TOF-SIMS

For the measurement of the amount of ions (peak intensity) using TOF-SIMS, TRIFT-IV manufactured by ULVAC-PHI, Inc. is used.

The analysis conditions are as follows.

Sample preparation: toner is adhered to an indium sheet

Sample pretreatment: none

Primary ion: Au ion

Acceleration voltage: 30 kV

Charge neutralization mode: On

Measurement mode: Positive

Raster: 200 μm

Measurement time: 60 s

Normally, TOF-SIMS is a surface analysis method, and the data in the depth direction relate to about 1 nm. Therefore, the intensity inside the toner particles is measured by sputtering the toner particles with argon gas cluster ions and scraping the surface. The sputtering conditions are as follows.

Acceleration voltage: 10 kV

Current: 3.4 nA

Raster: 600 um

Irradiation time: 5 s

In the depth measurement, a polymethylmethacrylate (PMMA) film is sputtered in advance under the same conditions to confirm the relationship with the irradiation time, and it is confirmed that 100 nm could be removed in an irradiation time of 300 s. The amount of ions at a position at a depth of 100 nm from the toner particle surface is the value of the amount of ions measured when sputtered 60 times under the above conditions. Further, the amount of ions on the surface (depth 0 nm) of the toner particle is the value of the amount of ions measured by using the toner particle from which the external additive has been removed by the aforementioned method and without performing the sputtering of the toner particles.

Calculation/definition of standard value, A(d max): the total count number of the mass numbers of the acid component-based monomer units among the alcohol component-based monomer units and the acid component-based monomer units constituting the structures (ester bonds) represented by the formula (C) and contained in the polar resin specified by the composition analysis according to the ULVAC-PHI standard software (Win Cadence) is taken as the amount of ions of the structure represented by the formula (C) (secondary ion mass/secondary ion charge number (m/Z)). The value obtained by dividing the value of this amount of ions by the total amount of counted ions is defined as the standard value.

As described above, the standard value on the outermost surface of the toner particles from which the external additive has been removed is defined as A(0). Further, the toner particle surface is scraped with an irradiation time of 5 sec under the above sputtering conditions, the operation of obtaining the standard value is repeated for a total of 300 sec (that is, to a depth of 100 nm), and each standard value from the toner particle surface to a depth of 100 nm is obtained. The standard value at a position at a depth of 100 nm from the toner particle surface is defined as A(100).

Figure 2:
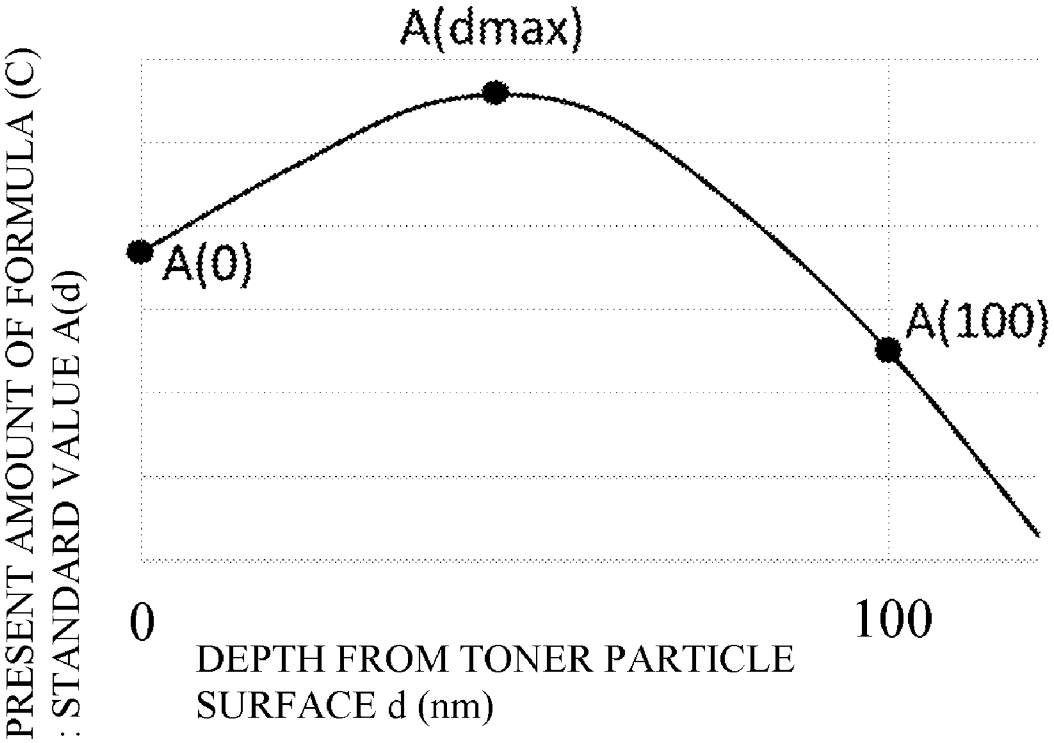
FIG. 2 is a schematic diagram of analysis results of time-of-flight secondary ion mass spectrometry of toner.

Further, among the standard values measured from the toner particle surface to 100 nm, the standard values larger than the values of A(0) and A(100) and having a value that is larger than A(0) and A(100) by at least a factor of 1.05 are defined as peaks. The largest peak among the obtained peaks is defined as A(d max). Therefore, when the standard value has a peak, the number of peaks can be from 1 to 58. A schematic diagram of the analysis results is shown in FIG. 2.

Method for Measuring Molecular Weight

The molecular weight of a resin such as polyester resin is measured by gel permeation chromatography (GPC) in the following manner. First, the polyester resin is dissolved in tetrahydrofuran (THF) at room temperature. Then, the obtained solution is filtered with a solvent-resistant membrane filter "Maeshori Disc" (manufactured by Tosoh Corporation) having a pore diameter of 0.2 μm to obtain a sample solution. The sample solution is adjusted so that the concentration of the component soluble in THF is 0.8% by mass. This sample solution is used for measurement under the following conditions.

Equipment: high-speed GPC device "HLC-8220GPC" (manufactured by Tosoh Corporation)
Column: two sets of LF-604
Eluent: THF
Flow velocity: 0.6 ml/min
Oven temperature: 40° C.
Sample injection amount: 0.020 ml In calculating the molecular weight of the sample, a molecular weight calibration curve plotted using standard polystyrene resins (for example, trade name "TSK standard polystyrene F-850, F-450, F-288, F-128, F-80, F-40, F-20, F-10, F-4, F-2, F-1, A-5000, A-2500, A-1000, A-500", manufactured by Tosoh Corporation) is used.

Acid Value of Polyester Resin

The acid value is the number of milligrams of potassium hydroxide required to neutralize the acid contained in 1 g of the sample. The acid value is measured according to JIS K 0070-1992, but specifically, it is measured according to the following procedure.

Titration is performed using a 0.1 mol/L potassium hydroxide ethyl alcohol solution (manufactured by Kishida Chemical Co., Ltd.). The factor of the potassium hydroxide ethyl alcohol solution can be determined by using a potentiometric titration device (potentiometric titration measuring device AT-510 manufactured by Kyoto Electronics Manufacturing Co., Ltd.). A total of 100 ml of 0.100 mol/L hydrochloric acid is taken in a 250 mL tall beaker, titration is performed with the potassium hydroxide ethyl alcohol solution, and the factor is determined from the amount of the potassium hydroxide ethyl alcohol solution required for neutralization. The 0.100 mol/L hydrochloric acid prepared according to JIS K8001-1998 is used.

The measurement conditions for acid value measurement are shown below.

Titration device: potentiometric titration device AT-510 (manufactured by Kyoto Electronics Manufacturing Co., Ltd.)
Electrode: composite glass electrode, double junction type (manufactured by Kyoto
Electronics Manufacturing Co., Ltd.)
Control software for titrator: AT-WIN
Titration analysis software: Tview The titration parameters and control parameters at the time of titration are as follows.

(Titration Parameters)
Titration mode: blank titration
Titration style: total titration
Maximum titration amount: 20 ml
Waiting time before titration: 30 sec
Titration direction: automatic
(Control Parameters)
End point determination potential: 30 dE
End point determination potential value: 50 dE/dmL
End point detection and determination: not set
Control speed mode: standard
Gain: 1
Data collection potential: 4 mV
Data collection titration amount: 0.1 ml Main test: 0.100 g of the measurement sample is precisely weighed in a 250 ml tall beaker, 150 ml of a mixed solution of toluene/ethanol (3:1) is added, and the dissolution is performed over 1 h. Titration is performed with the potentiometric titrator by using the potassium hydroxide ethyl alcohol solution.

Blank test: titration similar to the above procedure is performed, except that no sample is used (that is, only a mixed solution of toluene/ethanol (3:1) is used). The acid value is calculated by substituting the obtained result into the following formula.

$$A=[(C-B)\times f\times 5.611]/S$$

(In the formula, A: acid value (mg KOH/g), B: addition amount of potassium hydroxide ethyl alcohol solution in the blank test (ml), C: addition amount of potassium hydroxide ethyl alcohol solution in the main test (ml), f: potassium hydroxide solution factor, S: mass of sample (g)).

Method of Identifying and Quantifying Each Monomer Unit of Polyester Resin in Toner Particle For the analysis, a pyrolysis gas chromatography mass spectrometer (hereinafter, pyrolysis GC/MS) and NMR are used. A component having a molecular weight of 1500 or more is taken as a measurement object. This is because the region with a molecular weight of less than 1500 is considered to be a region in which the proportion of wax is high and the resin component is substantially not contained.

In pyrolysis GC/MS, it is possible to determine the constituent monomer units of the total amount of resin in the toner and determine the peak area of each monomer unit, but in order to perform quantification, it is necessary to standardize the peak intensity using a sample with a known concentration as a reference. Meanwhile, in NMR, it is possible to determine and quantify the constituent monomer units without using a sample having a known concentration.

Therefore, depending on the situation, the constituent monomer units are determined while comparing the spectra of both NMR and pyrolysis GC/MS. Specifically, when the amount of the resin component insoluble in deuterated chloroform, which is the extraction solvent at the time of NMR measurement, is less than 5.0% by mass, quantification is performed by NMR measurement.

Meanwhile, when a resin component insoluble in deuterated chloroform, which is an extraction solvent at the time of NMR measurement, is present in an amount of 5.0% by mass or more, both NMR measurement and pyrolysis GC/MS measurement are performed on the deuterated chloroform-soluble component, and pyrolysis GC/MS measurement is performed on the deuterated chloroform-insoluble component. In this case, first, NMR measurement of the deuterated chloroform-soluble component is performed, and the constituent monomer units are determined and quantified (quantification result 1).

Next, pyrolysis GC/MS measurement is performed on the deuterated chloroform-soluble component, and the peak area of the peak attributed to each constituent monomer unit is determined. Using the quantitative result 1 obtained by NMR measurement, the relationship between the amount of each constituent monomer unit and the peak area of pyrolysis GC/MS is determined. Next, pyrolysis GC/MS measurement of the deuterated chloroform-insoluble component is performed, and the peak area of the peak attributed to each constituent monomer unit is determined. Based on the relationship between the amount of each constituent monomer unit obtained by measuring the deuterated chloroform-soluble component and the peak area of pyrolysis GC/MS, the constituent monomer units in the deuterated chloroform-insoluble component are quantified (quantification results 2). Then, the quantification result 1 and the quantification result 2 are combined to obtain the final quantification result of each constituent monomer unit. Specifically, the following operations are performed.

(1) A total of 500 mg of toner is weighed into a 30 mL glass sample bottle, 10 mL of deuterated chloroform is added, the bottle is covered, and dispersion and dissolution are performed with an ultrasonic disperser for 1 h. Then, filtration is performed with a membrane filter having a diameter of 0.4 and the filtrate is collected. At this time, the deuterated chloroform-insoluble component remains on the membrane filter.

(2) Using high-performance liquid chromatography (HPLC), components having a molecular weight of less than 1500 are removed from 3 mL of the filtrate with a fraction collector, and a resin solution from which the components having a molecular weight of less than 1500 have been removed is collected. Chloroform is removed from the collected solution using a rotary evaporator to obtain a resin. The components with a molecular weight less than 1500 are determined by measuring a polystyrene resin having a known molecular weight in advance and obtaining the elution time.

(3) A total of 20 mg of the obtained resin is dissolved in 1 mL of deuterated chloroform, $^{1}$H-NMR measurement is performed, a spectrum is attributed to each constituent monomer used for the binder resin such as polyester resin and vinyl resin, and a quantitative value is obtained.

(4) If the deuterated chloroform-insoluble component needs to be analyzed, analysis is performed by pyrolysis GC/MS. If necessary, derivatization treatment such as methylation is performed.

NMR Measurement Conditions

Measuring device: Bruker AVANCE 500, manufactured by Bruker Biospin Co., Ltd.

Measurement nucleus: $^{1}$H

Measurement frequency: 500. 1 MHz

Integration number: 16 times

Measurement temperature: room temperature

Measurement Conditions for Pyrolysis GC/MS

Pyrolysis device: TPS-700, manufactured by Nippon Analytical Industry Co., Ltd.

Pyrolysis temperature: appropriate value from 400° C. to 600° C., 590° C. in this case GC/MS device: ISQ, manufactured by Thermo Fisher Scientific Co., Ltd.

Column: "HP5-MS" (Agilent/190915-433), length 30 m, inner diameter 0.25 mm, membrane thickness 0.25 μm GC/MS conditions Injection port conditions:

InletTemp: 250° C.

SplitFlow: 50 ml/min

GC temperature rise condition: 40° C. (5 min)→10° C./min (300° C.)→300° C. (20 min)

Mass range: m/z=10 to 550

Method for Calculating Shell Thickness of Core-Shell Structure

Cross-section observation of toner with a transmission electron microscope (TEM) can be performed in the following manner.

First, the toner is sprayed on cover glass (Matsunami Glass Co., Ltd., angular cover glass, Square No. 1) so as to form a single layer, and an Os film (5 nm) and a naphthalene film (20 nm) are applied as protective films by using an osmium plasma coater (filgen Co., Ltd., OPC80T). Next, a PTFE tube (inner diameter Φ1.5 mm×outer diameter Φ3 mm×3 mm) is filled with a photocurable resin D800 (JEOL Ltd.), and the cover glass is gently placed on the tube with the orientation such that the toner comes into contact with the photocurable resin D800. After curing the resin by light irradiation in this state, the cover glass and the tube are removed to form a cylindrical resin in which toner is embedded in the outermost surface.

A layer with a thickness equal to the half of the toner particle diameter (4.0 μm when the weight average particle diameter (D4) is 8.0 μm) is cut from the outermost surface of the cylindrical resin at a cutting speed of 0.6 mm/s by an ultrasonic ultramicrotome (Leica Biosystems Nussloch GmbH, UC7) to expose a cross section of the toner particles. Next, the magnetic toner is cut to a film thickness of 250 nm, and the non-magnetic toner is cut to a film thickness of 70 nm to prepare a flaky sample of toner particle cross section. By cutting by such a method, a cross section of the central portion of the toner particle can be obtained.

Subsequently, the constituent elements of the obtained cross section of the toner particles are analyzed using energy dispersive X-ray spectroscopy (EDX) to prepare an EDX mapping image. Using a transmission electron microscope (JEM-2800 manufactured by JEOL Ltd.) (TEM-EDX) and setting a magnification to 40000 to 50000, the shell layer is observed from the cross section of the toner, and element mapping using EDX is performed. In the EDX mapping image, the signal derived from the constituent elements of the shell material is confirmed in the contour of the cross section of the toner particles, and the presence or absence of the shell is confirmed. The mapping conditions are a storage rate of from 9000 to 13000, and an integration number of 120 times.

In the EDX mapping image, the contour and center point of the toner particle cross section are obtained. It is assumed that the cross section of the toner particle to be observed exhibits a major axis R (μm) satisfying the relationship of 0.9≤R/D4≤1.1 with the weight average particle diameter (D4) of the toner. The contour of the cross section of the toner particle is assumed to be along the toner particle surface observed in the EDX mapping image. The center point of the toner particle cross section is assumed to be the geometric center of the toner particle cross section. Lines are drawn from the obtained center point to the contour of the toner particle cross section. The lines are drawn to form an orthogonal cross in the center point of the cross section. The thickness of the shell is measured at four points at the ends of the cross lines in one toner particle cross section. In the toner particle cross section, a signal portion derived from the constituent elements of the shell material is taken as the shell. A total of 100 toner cross sections are observed and the average value of the shell thickness is calculated.

Method for Measuring Number Average Particle Diameter of Primary Particles of Silica Fine Particles The number average particle diameter (D1) of the primary particles of the silica fine particles is calculated from the silica fine particles image of the toner surface taken by Hitachi ultra-high-resolution field-emission scanning electron microscope S-4800 (Hitachi High-Technologies Corporation). The image capturing conditions of S-4800 are as follows.

(1) Sample Preparation

A thin layer of conductive paste is coated on a sample table (aluminum sample table 15 mm×6 mm) and a toner is sprayed thereon. Further air blowing is performed to remove excess toner from the sample table and dry the toner sufficiently. The sample table is set in a sample holder and the sample table height is adjusted to 36 mm with a sample height gauge.

(2) Observation Condition Setting in S-4800

The number average particle diameter of the primary particles of the silica fine particles is calculated using the image obtained by backscattered electron image observation in S-4800. Since the backscattered electron image has less charge-up of silica fine particles than a secondary electron image, the particle diameter of the silica fine particles can be measured with high accuracy.

Liquid nitrogen is injected into an anti-contamination trap attached to the housing of S-4800 until the nitrogen overflows, and the microscope is allowed to stand for 30 min. The "PC-SEM" of S-4800 is started and flushing (cleaning of an FE chip which is an electron source) is performed. An acceleration voltage display part of a control panel on a screen is clicked and a [Flushing] button is pressed to open a flushing execution dialog. A flushing intensity of 2 is confirmed and flushing is executed. It is confirmed that the emission current due to flushing is from 20 μA to 40 μA. The sample holder is inserted into the sample chamber of the S-4800 housing. [Origin] on the control panel is pressed to move the sample holder to the observation position.

The acceleration voltage display part is clicked to open an HV setting dialog, the acceleration voltage is set to [0.8 kV] and the emission current is set to [20 μA]. In the [Base] tab of the operation panel, the signal selection is set to [SE], [Top (U)] and [+BSE] are selected for the SE detector, and [L. A. 100] is selected in the selection box to the right of [+BSE] to set a mode for observing with a backscattered electron image. Similarly, in the [Base] tab of the operation panel, the probe current of an electrooptical system condition block is set to [Normal], a focal mode is set to [UHR], and WD is set to [3.0 mm]. An [ON] button on the acceleration voltage display portion of the control panel is pressed to apply an acceleration voltage.

(3) Calculation of Number Average Particle Diameter (D1) of Silica Fine Particles The inside of the magnification display portion of the control panel is dragged to set the magnification to 100000 (100 k) times. The focus knob [COARSE] on the operation panel is rotated and the aperture alignment is adjusted to a certain degree of focusing. [Align] on the control panel is clicked to display an alignment dialog, and [Beam] is selected. STIGMA/ALIGNMENT knobs (X, Y) on the operation panel are rotated to move the displayed beam to the center of the concentric circles. Next, [Aperture] is selected and the STIGMA/ALIGNMENT knobs (X, Y) are rotated one by one to stop the movement of the image or adjust it to the minimum movement. The aperture dialog is closed and focusing is performed with autofocus. This operation is repeated twice more to focus.

After that, the particle diameter of at least 300 silica fine particles on the toner surface is measured to obtain the average particle diameter. Here, since some silica fine particles are also present as aggregates, the maximum diameter of particles that can be confirmed as primary particles is obtained, and the obtained maximum diameters are arithmetically averaged to obtain the number average particle diameter of the primary particles of the silica fine particles.

Method for Measuring Weight Average Particle Diameter (D4) of Toner

The weight average particle diameter (D4) and the number average particle diameter (D1) of the toner were measured at the number of effective measurement channels of 25,000 by using a precision particle size distribution measuring device "Coulter Counter Multisizer 3" (registered trademark, manufactured by Beckman-Coulter Inc.) which is based on the pore electrical resistivity method and equipped with a 100-μm aperture tube and dedicated software "Beckman Coulter Multisizer 3 Version 3.51" (produced by Beckman-Coulter Inc.) for setting measurement conditions and analyzing measurement data, the measurement data were analyzed and calculations were performed. An electrolytic aqueous solution to be used for the measurement can be prepared by dissolving special grade sodium chloride in ion-exchanged water so that the concentration becomes about 1% by mass. For example, "ISOTON II" (manufactured by Beckman-Coulter Inc.) can be used. Before performing the measurement and analysis, the dedicated software was set as follows.

On a "Change standard measurement method (SOM) screen" of the dedicated software, the total count number in the control mode is set to 50000 particles, the number of measurement cycles to 1, and a Kd value to a value obtained using "standard particles 10.0 μm" (manufactured by Beckman-Coulter Inc.). By pressing a threshold/noise level measurement button, the threshold and noise level are automatically set. Further, the current t is set to 1600 μA, the gain to 2, and the electrolyte to ISOTON II, and the flush of the aperture tube after measurement is checked. On the "Pulse to particle diameter conversion setting screen" of the dedicated software, a bin spacing is set to a logarithmic particle diameter, a particle diameter bin to 256 particle diameter bin, and the particle diameter range from 2 μm to 60 μm. The specific measurement method is as follows.

1. About 200 ml of the electrolytic aqueous solution is put in a glass 250 ml round bottom beaker provided with the Multisizer 3, the beaker is set on the sample stand, and counterclockwise stirring with the stirrer rod is performed at 24 revolutions/sec. Then, dirt and air bubbles in the aperture tube are removed by the "Flush of the aperture tube" function of the dedicated software.

2. About 30 ml of the electrolytic aqueous solution is placed in a 100 ml flat-bottomed beaker made of glass, and about 0.3 ml of a diluted solution prepared by threefold mass dilution of "Contaminone N" (10% by mass aqueous solution of a neutral detergent for cleaning precision measuring instruments that is composed of a nonionic surfactant, an anionic surfactant, and an organic builder and has pH 7, manufactured by Wako Pure Chemical Industries, Ltd.) with ion-exchanged water is added as a dispersant thereto.

3. A predetermined amount of ion-exchanged water is put in a water tank of an ultrasonic disperser "Ultrasonic Dispersion System Tetora 150" (manufactured by Nikkaki Bios Co., Ltd.) in which two oscillators with an oscillation frequency of 50 kHz are built in with a phase shifted by 180 degrees and which has an electrical output of 120 W, and about 2 ml of the Contaminone N is added to the water tank.

4. The beaker of 2. is set into a fixing hole of the ultrasonic disperser, and the ultrasonic disperser is operated. The height position of the beaker is adjusted so that the resonance state of the liquid level of the electrolytic solution in the beaker is maximized.

5. With the electrolytic aqueous solution in the beaker of 4. irradiated with ultrasonic waves, about 10 mg of toner is added little by little to the electrolytic aqueous solution and dispersed. Then, the ultrasonic dispersion processing is continued for another 60 sec. In the ultrasonic dispersion, the water temperature in the water tank is adjusted, as appropriate, to be from 10° C. to 40° C.

6. The electrolytic aqueous solution of 5. in which the toner was dispersed is added dropwise by using a pipette to the round-bottomed beaker of 1. that was installed in the sample stand, and the measurement concentration is adjusted to about 5%. Then, the measurement is performed until the number of measured particles reaches 50,000.

7. The measurement data are analyzed with the dedicated software provided with the device, and the weight average particle diameter (D4) and the number average particle diameter (D1) are calculated. The "arithmetic diameter" on the analysis/number statistics (arithmetic mean) screen and the analysis/volume statistics (arithmetic mean) screen when graph/number% and graph/volume % are set with the dedicated software are the number average particle diameter (D1) and the weight average particle diameter (D4), respectively.

EXAMPLES

The present invention will be described hereinbelow in more detail with reference to Examples and Comparative Examples, but the present invention is not limited thereto. Unless otherwise specified, the parts used in the examples are based on mass.

Production Example of Silica Fine Particles 1

A total of 100 parts of fumed silica (silica base; spherical, BET specific surface area: 300 $m^2/g$) was placed in a reaction vessel, a solution obtained by dissolving 20 parts of the polydimethylsiloxane represented by the formula (A) (kinematic viscosity at a temperature of 25° C. is 50 $mm^2/s$, average number of repeating units n=60) in 100 parts of hexane was added while stirring under a nitrogen purge, and first, the treatment was performed at a reaction temperature and for a reaction time shown in Treatment Conditions 1 in Table 1 while continuing stirring. Then, a solution obtained by diluting 10 parts of polydimethylsiloxane represented by the formula (B) shown in the Treatment Conditions 2 in Table 1 with 100 parts of hexane was added, and the treatment was performed at a reaction temperature and for a reaction time shown in Treatment Conditions 2 in Table 1. The obtained silica fine particles were then pulverized using a pin-type pulverizer to obtain silica fine particles 1. The number average particle diameter of primary particles of the obtained silica fine particles 1 was 8 nm. Table 1 shows the physical properties of the silica fine particles 1.

Production Example of Silica Fine Particles 2 to 12

Silica fine particles 2 to 12 were produced in the same manner as in the production example of silica fine particles 1, except that Treatment Conditions 1 (the amount of polydimethylsiloxane added, reaction temperature, and reaction time) and Treatment Conditions 2 (the type and amount added of polydimethylsiloxane, reaction temperature, and reaction time) in the production example of silica fine particles 1 were changed as described in Table 1. Table 1 shows the physical properties.

TABLE 1

| Silica fine particles No. | Treatment procedure, and compounds and treatment conditions used | | | | | | | | | | Physical properties of silica fine particles | |
|---|---|---|---|---|---|---|---|---|---|---|---|---|
| | Treatment conditions 1 | | | | Treatment conditions 2 | | | | | | | |
| | BET [$m^2/g$] | parts of (A) | RTemp [° C.] | RT [min] | $R^1$ in formula (B) | $R^2$ in formula (B) | m in formula (B) | parts of (B) | RTemp [° C.] | RT [min] | PD [nm] | A [ppm] |
| 1 | 300 | 20 | 300 | 120 | Hydroxy group | Hydroxy group | 50 | 10 | 300 | 120 | 8 | 1.5 |
| 2 | 300 | 35 | 300 | 120 | Hydroxy group | Hydroxy group | 50 | 2 | 300 | 120 | 10 | 2.8 |
| 3 | 300 | 5 | 300 | 120 | Hydroxy group | Hydroxy group | 50 | 25 | 300 | 120 | 9 | 1.2 |
| 4 | 380 | 6 | 300 | 120 | Hydroxy group | Hydroxy group | 50 | 30 | 300 | 120 | 5 | 1.3 |
| 5 | 90 | 10 | 300 | 120 | Hydroxy group | Hydroxy group | 50 | 5 | 300 | 120 | 28 | 1.1 |
| 6 | 50 | 8 | 300 | 120 | Hydroxy group | Hydroxy group | 50 | 4 | 300 | 120 | 35 | 1.0 |
| 7 | 380 | 42 | 300 | 120 | — | — | — | — | — | — | 6 | 8.5 |
| 8 | 380 | 24 | 300 | 120 | Hydrogen atom | Hydrogen atom | 50 | 12 | 300 | 120 | 6 | 4.8 |
| 9 | 380 | 24 | 300 | 120 | Carbinol group | Carbinol group | 50 | 12 | 300 | 120 | 5 | 4.9 |
| 10 | 50 | 2 | 300 | 120 | Hydroxy group | Hydroxy group | 50 | 10 | 300 | 120 | 34 | 0.8 |
| 11 | 50 | — | — | — | Hydrogen atom | Hydrogen atom | 50 | 12 | 300 | 120 | 34 | 0.5 |
| 12 | 50 | 12 | 300 | 120 | — | — | — | — | — | — | 36 | 1.3 |

In the Table, BET indicates "BET specific surface area of raw material [$m^2/g$]", RTemp indicates Reaction temperature [° C.], RT indicates Reaction time [min].

Also, in the table, the "parts of (A)" is the number of parts of the polydimethylsiloxane represented by the formula (A) that was used for treating 100 parts of the silica base (that is, silica fine particles before surface treatment). The "parts of (B)" is the number of parts of the polydimethylsiloxane represented by the formula (B) that was used for treating 100 parts of the silica base. The "PD" indicates the number average particle diameter of the primary particles and "A" indicates "Amount of trimethylsilanol (ppm)".

Production Example of Polyester Resin 1

A total of 100 parts of a mixture in which raw material monomers other than trimellitic anhydride were mixed in the charging amounts shown in Table 2 and 0.52 parts of tin di(2-ethylhexanoate) as a catalyst were placed in a polymerization tank equipped with a nitrogen introduction line, a dewatering line, and a stirrer. Next, after converting the atmosphere inside the polymerization tank into a nitrogen atmosphere, a polycondensation reaction was carried out over 6 h while heating at 200° C. Further, after raising the temperature to 210° C., trimellitic anhydride was added, the pressure inside the polymerization tank was reduced to 40 kPa, and then a condensation reaction was further carried out. Table 2 shows the acid value and molecular weight of the obtained resin.

Production Examples of Polyester Resins 2 to 9

Polyester resins 2 to 9 were produced by using the raw material monomer charging amounts shown in Table 2 in the production example of polyester resin 1 and performing the same operations as in the production of the polyester resin 1. At that time, sequential sampling and measurement were performed, and when the desired molecular weight was reached, the polymerization reaction was stopped and the resin was taken out from the polymerization tank. Table 2 shows the physical properties of the obtained resins.

In the polyester resin 4, polyester resin 7, and polyester resin 9, a bisphenol A propylene oxide 2 mol adduct and a bisphenol A ethylene oxide 3 mol adduct were used at a molar ratio of 80.0 to 20.0 as the BPA. Unless BPA is otherwise specified, a bisphenol A propylene oxide 2 mol adduct was used.

TABLE 2

| | Acid | | Alcohol | | | Physical properties of resin | |
|---|---|---|---|---|---|---|---|
| | TPA | TMA | BPA | EG | Isosorbide | Acid value | Weight average molecular weight Mw |
| Polyester resin -1 | 45.0% | 2.0% | 32.0% | 18.0% | 3.0% | 6 | 12400 |
| Polyester resin -2 | 45.0% | 1.5% | 25.0% | 25.0% | 3.5% | 4.5 | 14200 |
| Polyester resin -3 | 45.0% | 3.5% | 45.0% | 5.0% | 1.5% | 8.2 | 9900 |
| Polyester resin -4 | 45.0% | 4.0% | 50.0% | 0.5% | 0.5% | 10.3 | 8800 |
| Polyester resin -5 | 45.0% | 1.0% | 20.0% | 30.0% | 4.0% | 4 | 14700 |
| Polyester resin -6 | 45.0% | 4.0% | 47.0% | 3.0% | 1.0% | 9.1 | 9400 |
| Polyester resin -7 | 45.0% | 4.0% | 50.4% | 0.5% | 0.1% | 10.1 | 9000 |
| Polyester resin -8 | 45.0% | 0.5% | 10.0% | 40.0% | 4.5% | 3.3 | 15500 |
| Polyester resin -9 | 45.0% | 4.0% | 50.5% | 0.5% | 0.0% | 10.3 | 8800 |

* The notation of the monomer composition indicates the ratio in % by mass when the mass of the polyester composition is 100. The unit of acid value is mgKOH/g.

The abbreviations in the above table are as follows:

TPA: terephthalic acid

TMA: trimellitic acid

BPA: bisphenol A propylene oxide or ethylene oxide adduct (details as described above)

EG: ethylene glycol

Production Example of Styrene-Acrylic Resin 1

The following materials were mixed in a reaction vessel equipped with a cooling tube, a stirrer, and a nitrogen introduction tube, heated and kept at 180° C. while stirring.

| | |
|---|---|
| Styrene | 77.0 parts |
| n-Butyl acrylate | 21.0 parts |
| Acrylic acid | 2.0 parts |
| Xylene | 300.0 parts |

Subsequently, 50.0 parts of a xylene solution of 2.0% by mass of t-butyl hydroperoxide was continuously added dropwise into the system over 4.5 h, and after cooling, the solvent was separated and removed and styrene-acrylic resin 1 was synthesized. The weight average molecular weight Mw was 14,500 and Tg was 65° C.

Production Example of Polyester Resin Particle-Dispersed Solution 1

The polyester resin 7 was dispersed using a disperser obtained by modifying Cavitron CD1010 (manufactured by Eurotec Ltd.) into a high-temperature and high-pressure type. With a composition ratio of 80% by mass of ion-exchanged water and 20% by mass of polyester resin, the pH was adjusted to 8.5 with ammonia, and the Cavitron was operated under the conditions of the rotation speed of a rotor of 60 Hz, a pressure of 5 $kg/cm^2$, and heating at 140° C. with a heat exchanger to obtain a polyester resin particle-dispersed solution. Ion-exchanged water was added to this dispersion liquid to adjust the solid component amount to 20% by mass, and this was used as a polyester resin particle-dispersed solution 1.

Production Example of Polyester Resin Particle-Dispersed Solution 2 in the Absence of Organic Solvent A total of 200 parts of the polyester resin 7 and 0.2 parts of a 50% by mass aqueous solution of sodium hydroxide were put into the raw material inlet of a twin-screw extruder (TEM-26SS, manufactured by Toshiba Machinery Co., Ltd.), 4.1 parts of a 48.5% by mass aqueous solution of sodium dodecyldiphenyl ether disulfonate (Eleminol MON-7, manufactured by Sanyo Chemical Industries, Ltd.) was added as a surfactant from the fourth barrel of the twin-screw extruder, and kneading was performed at a barrel temperature of 90° C. and a screw rotation speed of 400 rpm to mix the polyester resin, sodium hydroxide, and surfactant.

A total of 150 parts of ion-exchanged water (ion-exchanged water 1) adjusted to 90° C. was added from the fifth barrel of the twin-screw extruder, 150 parts of ion-exchanged water (ion-exchanged water 2) adjusted to 90° C. was added from the seventh barrel, and 150 parts of ion-exchanged water (ion-exchanged water 3) adjusted to 90° C. was added from the ninth barrel, followed by kneading to obtain an aqueous dispersion liquid of polyester resin particles. Ion-exchanged water was added to this dispersion liquid to adjust the solid component amount to 20% by mass, and the obtained dispersion liquid was used as a polyester resin particle-dispersed solution 2.

Production Example of Toner Particles 1

Toner particles 1 were produced by the following procedure. The following materials were put into an attritor (Mitsui Miike Machinery Co., Ltd.) and further dispersed using zirconia particles having a diameter of 1.7 mm at 220 rpm for 5 h to obtain a pigment masterbatch.

| | |
|---|---|
| Styrene | 60.0 parts |
| Carbon black (manufactured by Orion Engineered Carbons GmbH, product name “Printex 35”) | 7 parts |
| Charge control agent (manufactured by Orient Chemical Industries, Ltd.: Bontron E-89) | 0.10 parts |

A total of 450 parts of 0.1 mol/L-$Na_3PO_4$ aqueous solution was added to 720 parts of ion-exchanged water, followed by heating to 60° C., and then 67.7 parts of 1.0 mol/L-$CaCl_2$ aqueous solution was added to obtain an aqueous medium including a dispersion stabilizer Preparation of Polymerizable Monomer Composition

| | |
|---|---|
| Styrene | 14.0 parts |
| n-Butyl acrylate | 26.0 parts |
| 1,6-Hexanediol diacrylate | 0.6 parts |
| Pigment masterbatch | 67.1 parts |
| Polyester resin 1 | 4.0 parts |

The above materials were uniformly dispersed and mixed using an attritor (manufactured by Mitsui Miike Machinery Co., Ltd.). The mixture was then heated to 60° C., and 10.0 parts of paraffin wax (HNP-51, manufactured by Nippon Seiro Co., Ltd.) was added as a hydrocarbon wax, mixed and dissolved to obtain a polymerizable monomer composition.

The polymerizable monomer composition was put into the aqueous medium and stirred and granulated for 10 min at 12000 rpm in T. K. Homomixer (manufactured by Tokushu Kagaku Kogyo Co., Ltd.) in an $N_2$ atmosphere at 60° C. Then, while stirring with a paddle stirring blade, 8.0 parts of t-butylperoxypivalate as a polymerization initiator was added, the temperature was raised to 74° C., and the reaction was carried out for 3 h. After completion of the reaction, the suspension was heated to 100° C. and kept at a pH(1) of 5.0 of the suspension for 2 h as the abovementioned high-temperature and high-pH treatment step. Then, while the suspension was at 100° C., a 0.9 mol/L-$Na_2CO_3$ aqueous solution was added, the pH(2) of the suspension was adjusted to 8.0, and the suspension was kept for 30 min. Then, the suspension was cooled at room temperature to 25° C. by natural cooling. Then, hydrochloric acid was added to the suspension for thorough washing to dissolve the dispersion stabilizer. Toner particles 1 having a weight average particle diameter of 7.1 μm were then obtained by filtration and drying.

Production Examples of Toner Particles 2 to 7, 10 and 11

Toner particles 2 to 7, 10 and 11 were obtained by performing the same operations as in the production example of toner particle 1, except that the polyester resin type, the polyester resin amount, and the high-temperature and high-pH treatment step conditions were changed as shown in Table 3.

TABLE 3

| Toner particles No. | Polyester resin type | Polyester resin amount [parts] | High-temperature and high-pH treatment step conditions Temp. ° C. | pH (1) | pH (2) |
|---|---|---|---|---|---|
| 1 | Polyester resin 1 | 4.0 | 100 | 5.0 | 8.0 |
| 2 | Polyester resin 1 | 4.0 | 100 | 5.0 | 10.5 |
| 3 | Polyester resin 1 | 4.0 | 95 | 5.0 | 6.0 |
| 4 | Polyester resin 2 | 2.0 | 100 | 5.0 | 11.0 |
| | Polyester resin 3 | 8.0 | | | |
| 5 | Polyester resin 4 | 4.0 | 90 | 5.0 | 5.5 |
| 6 | Polyester resin 5 | 11.0 | 100 | 5.0 | 11.0 |
| | Polyester resin 6 | 1.0 | | | |
| 7 | Polyester resin 7 | 4.0 | 90 | 5.0 | 5.5 |
| 8 | | Described in the specification | | | |
| 9 | | Described in the specification | | | |
| 10 | Polyester resin 8 | 16.0 | 100 | 5.0 | 11.0 |
| | Polyester resin 9 | 1.0 | | | |
| 11 | Polyester resin 10 | 4.0 | 100 | 5.0 | 5.0 |
| 12 | | Described in the specification | | | |
| 13 | | Described in the specification | | | |

In the Table, “Temp.” indicates “Temperature”.

Production Example of Toner Particles 8

Preparation of Styrene-Acrylic Resin Particle Dispersion

| | |
|---|---|
| Styrene | 77 parts |
| n-Butyl acrylate | 23 parts |

A solution prepared by dissolving 1.0 part of an anionic surfactant (Dowfax, manufactured by Dow Chemical Co., Ltd.) in 60 parts of ion-exchanged water was added to a solution obtained by mixing the above materials, and the components were dispersed and emulsified in a flask to produce a monomer emulsion. Subsequently, 2.0 parts of an anionic surfactant (Dowfax, manufactured by Dow Chemical Co., Ltd.) was dissolved in 90 parts of ion-exchanged water, 2.0 parts of the monomer emulsion was added thereto, and then 10 parts of ion-exchanged water in which 1.0 part of ammonium persulfate was dissolved was further added.

After that, the rest of the monomer emulsion was added over 3 h, and the inside of the flask was replaced with nitrogen, then the solution in the flask was heated in an oil bath to 65° C. while stirring, and then emulsion polymerization was continued for 5 h under the same conditions to obtain a styrene-acrylic resin particle-dispersed solution. The solid component amount in the styrene-acrylic resin particle-dispersed solution was adjusted to 20% by mass by adding ion-exchanged water.

Preparation of Colorant Particle-Dispersed Solution

| | |
|---|---|
| Cyan pigment (manufactured by Dainichiseika Color & Chemicals Mfg. Co., Ltd., Pigment Blue 15:3 (copper phthalocyanine)) | 45 parts |
| Anionic surfactant (Neogen R, manufactured by DKS Co., Ltd.) | 2 parts |
| Ion-exchanged water | 250 parts |

The above materials were mixed, dissolved, and dispersed for about 1 h using a high-pressure impact disperser ULTIMIZER (manufactured by Sugino Machine Ltd., HJP30006) to obtain a colorant particle-dispersed solution. The volume average particle diameter D50v of the particles in the colorant particle-dispersed solution was 150 nm. Then, ion-exchanged water was added to obtain the solid component concentration of 20% by mass.

Preparation of Release Agent Particle-Dispersed Solution

| | |
|---|---|
| Paraffin wax (hydrocarbon wax, HNP9, manufactured by Nippon Seiro Co., Ltd., melting temperature 75° C., second endothermic peak temperature (one second endothermic peak) 84° C.) | 270 parts |
| Anionic surfactant (Neogen RK, manufactured by DKS Co., Ltd.) (active ingredient 60% by mass, 3% by mass with respect to the release agent) | 13.5 parts |
| Ion-exchanged water | 21.6 parts |

After mixing the above materials and dissolving the release agent at an internal liquid temperature of 120° C. with a pressure discharge homogenizer (Gaulin homogenizer, manufactured by Gaulin Co.), dispersion treatment was performed at a dispersion pressure of 5 MPa for 120 min and then at 40 MPa for 360 min, and then cooling was performed to obtain a dispersion liquid. Ion-exchanged water was added to adjust the solid component amount to 20% by mass, and this was used as a release agent particle-dispersed solution.

Production of Toner Particles

| | |
|---|---|
| Styrene-acrylic resin particle-dispersed solution | 375 parts |
| Colorant particle-dispersed solution | 75 parts |
| Release agent particle-dispersed solution | 15 parts |
| Ion-exchanged water | 750 parts |
| Anionic surfactant (Dowfax 2A1 manufactured by Dow Chemical Co., Ltd.) | 3.2 parts |

The above materials were put as core forming materials in a 3-liter reaction vessel equipped with a thermometer, a pH meter and a stirrer, 1.0% nitric acid was added at a temperature of 25° C. to adjust the pH to 3.0, and then 100 parts of magnesium chloride aqueous solution having a concentration of 2.0% by mass was added as a flocculant, while dispersing at 5000 rpm with a homogenizer (ULTRA-TURRAX T50 manufactured by IKA), and the dispersion was performed for 6 min.

After that, heating in a water bath for heating was performed to 53° C. while using a stirring blade and adjusting the rotation speed so that the mixed liquid was stirred. The volume average particle diameter of the formed aggregated particles was confirmed, as appropriate, with a Coulter Multisizer III, and when the volume average particle diameter reached 5.0 μm, the temperature was kept, and 205 parts of the polyester resin particle-dispersed solution 1 was added over 5 min as a material for forming a shell layer. Then, after keeping at 50° C. for 30 min, the temperature was raised to 90° C. while adjusting the pH to 9.0, followed by keeping at 90° C.

After that, hydrochloric acid was added to adjust the pH(1) at 90° C. to 5.0, followed by further stirring for 30 min. Then, a 0.9 mol/L-$Na_2CO_3$ aqueous solution was added, and the pH(2) was adjusted to 5.5, followed by keeping for 30 min. Then, cooling to 25° C., filtering and solid-liquid separation were followed by washing with ion-exchanged water. After the washing was completed, toner particles 8 having a weight average particle diameter of 7.2 μm were obtained by drying using a vacuum dryer.

Production Example of Toner Particles 9

The following materials were well mixed with an FM mixer (manufactured by Nippon Coke Industries Co., Ltd.) and then melt-kneaded with a twin-screw kneader (manufactured by Ikegai Iron Works Co., Ltd.) set at a temperature of 100° C.

| | |
|---|---|
| Styrene-acrylic resin 1 | 95.0 parts |
| HNP9 (melting point: 76° C., manufactured by Nippon Seiro Co., Ltd.) | 5.0 parts |
| C.I. Pigment Blue 15:3 | 6.0 parts |

The obtained kneaded product was cooled and coarsely pulverized to 1 mm or less with a hammer mill to obtain a coarsely pulverized product. Next, the obtained coarsely pulverized product was converted into a finely pulverized product having a size of about 5 μm by using a turbo mill manufactured by Turbo Industries, Ltd., and then the fine and coarse powders were further cut using a multi-division classifier utilizing the Coanda effect to obtain toner base particles 1.

A total of 450 parts of 0.1 mol/L-$Na_3PO_4$ aqueous solution was added to 720 parts of ion-exchanged water, followed by heating to 60° C. in an $N_2$ atmosphere, and then 67.7 parts of 1.0 mol/L-$CaCl_2$ aqueous solution was added to obtain an aqueous medium including a dispersion stabilizer.

A total of 200.0 parts of toner base particles 1 was put into the aqueous medium and dispersed for 30 min by using T. K. Homomixer and rotating at 7000 rpm at a temperature of 40° C. Ion-exchanged water was added to adjust the concentration of toner base particles in the dispersion liquid to 20.0% by mass to obtain a toner base particle-dispersed solution 1.

The following samples were weighed in a reaction vessel and mixed using a propeller stirring blade.

| | |
|---|---|
| Toner base particle-dispersed solution 1 | 500.0 parts |
| Polyester resin particle-dispersed solution 1 | 20.0 parts |

Next, the pH of the obtained mixture was adjusted to 7.0 by using a 1 mol/L NaOH aqueous solution, and the temperature of the mixture was adjusted to 30° C., followed by keeping for 1.0 h while mixing at 200 rpm by using a propeller stirring blade. Then, the temperature was raised to 80° C. at a rate of 1° C./min, while stirring with the propeller stirring blade, followed by keeping for 2 h. After that, as the abovementioned high-temperature and high-pH treatment step, while stirring the obtained dispersion liquid with a paddle stirring blade, the suspension temperature was raised to 90° C., and hydrochloric acid was added to adjust the pH(1) of the suspension to 5.0, followed by keeping for 30 min, and then a 0.9 mol/L-$Na_2CO_3$ aqueous solution was added in a state with a suspension temperature of 90° C., and the pH(2) of the suspension was adjusted to 5.5, followed by keeping for 30 min. Then cooling to 25° C. was performed at room temperature by natural cooling. After that, hydrochloric acid was added to the suspension for thorough washing to dissolve the dispersion stabilizer. Toner particles 9 having a weight average particle diameter of 7.1 μm were then obtained by filtration and drying.

Production Example of Toner Particles 12

Preparation of Aqueous Medium

A total of 14.7 parts of magnesium chloride was put into a reaction vessel containing 350.0 parts of ion-exchanged water and dissolved, followed by keeping at 65° C. for 1.0 h while purging with nitrogen. Stirring at 12000 rpm was performed using T. K. Homomixer (manufactured by Tokushu Kagaku Kogyo Co., Ltd.). An aqueous solution of sodium hydroxide prepared by dissolving 10.4 parts of sodium hydroxide in 50.0 parts of ion-exchanged water was put all at once into the reaction vessel while maintaining stirring to prepare an aqueous medium including a dispersion stabilizer. Then, 1.0 mol/L hydrochloric acid was added to the aqueous medium in the reaction vessel to adjust the pH to 5.0 and prepare an aqueous medium.

Preparation of Polymerizable Monomer Composition

A polymerizable monomer composition was obtained by performing operations by the same method, except that the polyester resin 1 of the polymerizable monomer composition of the toner particles 1 was changed to the polyester resin 4.

Granulation Step

While maintaining the temperature of the aqueous medium at 70° C. and the rotation speed of the stirrer at 12000 rpm, the polymerizable monomer composition was put into the aqueous medium, and 7.0 parts of t-butylperoxypivalate as a polymerization initiator was added. Granulation was carried out with the stirrer as it was for 10 min while maintaining 12000 rpm.

Polymerization Step

The high-speed stirrer was replaced to a stirrer equipped with a propeller stirring blade, and the reaction was carried out at 80° C. for 3 h while stirring at 150 rpm. After completion of the reaction, the suspension was heated to 100° C. and kept at a pH(1) of 5.0 of the suspension for 2 h as the abovementioned high-temperature and high-pH treatment step. Then, while the suspension was at 100° C., a 0.9 mol/L-$Na_2CO_3$ aqueous solution was added, the pH(2) of the suspension was adjusted to 5.5, and the suspension was kept for 30 min. Then, the suspension was cooled at room temperature to 25° C. by natural cooling. Then, hydrochloric acid was added to the suspension for thorough washing to dissolve the dispersion stabilizer. Toner particles 12 having a weight average particle diameter of 7.4 μm were then obtained by filtration and drying.

Production Example of Toner Particles 13

Addition of Ammonium Compound

As the ammonium compound, a 10% by mass aqueous ammonia solution was used. A total of 2.5 parts of the ammonium compound was added to 1000 parts of the polyester resin particle-dispersed solution 2, followed by stirring for 3 min.

Preparation of Toner Component Dispersion Liquid

After adding the ammonium compound, the following components were placed in a stirring tank equipped with a thermometer, a pH meter, a stirrer, and a jacket, followed by stirring for 10 min. A colorant particle-dispersed solution and a release agent particle-dispersed solution were obtained by performing the same operations as in the preparation of the colorant particle-dispersed solution and the release agent particle-dispersed solution described in the production example of toner particles 8.

| | |
|---|---|
| Polyester resin particle-dispersed solution 2 to which the ammonium compound was added | 635 parts |
| Colorant particle-dispersed solution | 100 parts |
| Release agent particle-dispersed solution | 20 parts |
| Ion-exchanged water | 200 parts |
| Anionic surfactant (Neogen RK, manufactured by DSK Co., Ltd.,) | 7.0 parts |

While gradually adding 125 parts of an aqueous aluminum sulfate solution to the above dispersion liquid mixture placed in the stirring tank, the mixture was introduced into Cavitron CD1010 (manufactured by Eurotech Co., Ltd.) from the bottom valve of the stirring tank and dispersed for 10 min. After the addition was completed, the temperature of the jacket was started to be raised at 50° C., and after 120 min, the particle diameter was measured with Multisizer II (aperture diameter: 50 μm, manufactured by Beckman-Coulter Inc.). The volume average particle diameter was 5.0 μm. Then, 312 parts of the additional polyester resin particle-dispersed solution 1 was added, followed by keeping for 30 min.

After that, a 4% by mass sodium hydroxide aqueous solution was added to the stirring tank to adjust the pH to 9.0, and then the temperature of the jacket was raised to 90° C. and maintained. When the shape and surface properties of the aggregated particles were observed with an optical microscope and a scanning electron microscope (FE SEM) every 30 min, coalescence of the particles was confirmed at 4 h, so the obtained slurry was cooled to 40° C. The cooled slurry was sieved with a vibrating sieve (KGC800: manufactured by Kowa Kogyosho Co., Ltd.) having an opening of 15 μm, and then filtered with a filter press (manufactured by Tokyo Engineering Co., Ltd.). Then, ion-exchanged water in an amount 10 times the amount of the toner particles was passed through the toner particles in the filter press device to wash the toner particles. The washed toner particles were dried by cyclone collection using a loop type air flow dryer (Flash Jet Dryer FJD-2 manufactured by Seishin Enterprise Co., Ltd.) to obtain toner particles 13 having a weight average particle diameter of 7.5 μm.

Production Example of Toner 1

The following external additive was added to 100 parts of the toner particles 1, mixing was performed with FM mixer (manufactured by Nippon Coke Co., Ltd.) at a peripheral speed of 32 m/s for 10 min, and coarse particles were removed with a mesh with an opening of 45 μm to obtain a toner 1. Table 5 shows the physical properties of the obtained toner 1

| | |
|---|---|
| Silica fine particles 1 | 1.0 part |

Production Examples of Toners 2 to 26

Toners 2 to 26 were produced by performing the same operations as in the production example of toner 1, except that the toner particles, the type of the silica fine particles, and the number of parts of the silica fine particles added in the production example of toner 1 were changed as shown in Table 4.

TABLE 4

| Toner No. | Toner particles | Type of silica fine particles | Addition amount of silica fine particles [parts by mass] |
|---|---|---|---|
| 1 | Toner particles 1 | silica fine particles 1 | 1.0 |
| 2 | Toner particles 2 | silica fine particles 1 | 1.0 |
| 3 | Toner particles 3 | silica fine particles 1 | 1.0 |
| 4 | Toner particles 2 | silica fine particles 2 | 1.0 |
| 5 | Toner particles 3 | silica fine particles 3 | 1.0 |
| 6 | Toner particles 4 | silica fine particles 2 | 1.0 |
| 7 | Toner particles 5 | silica fine particles 3 | 1.0 |
| 8 | Toner particles 6 | silica fine particles 2 | 1.0 |
| 9 | Toner particles 7 | silica fine particles 3 | 1.0 |
| 10 | Toner particles 7 | silica fine particles 4 | 1.0 |
| 11 | Toner particles 7 | silica fine particles 5 | 1.5 |
| 12 | Toner particles 7 | silica fine particles 6 | 2.0 |
| 13 | Toner particles 8 | silica fine particles 6 | 2.0 |
| 14 | Toner particles 9 | silica fine particles 6 | 2.0 |

TABLE 4-continued

| Toner No. | Toner particles | Type of silica fine particles | Addition amount of silica fine particles [parts by mass] |
|---|---|---|---|
| 15 | Toner particles 6 | silica fine particles 1 | 0.5 |
| | | silica fine particles 7 | 0.5 |
| 16 | Toner particles 6 | silica fine particles 8 | 1.0 |
| 17 | Toner particles 6 | silica fine particles 9 | 1.0 |
| 18 | Toner particles 10 | silica fine particles 8 | 1.0 |
| 19 | Toner particles 11 | silica fine particles 6 | 2.0 |
| 20 | Toner particles 7 | silica fine particles 10 | 2.0 |
| 21 | Toner particles 7 | silica fine particles 11 | 2.0 |
| 22 | Toner particles 12 | silica fine particles 6 | 2.0 |
| 23 | Toner particles 8 | silica fine particles 11 | 2.0 |
| 24 | Toner particles 7 | silica fine particles 7 | 1.0 |
| 25 | Toner particles 13 | silica fine particles 12 | 2.0 |
| 26 | Toner particles 9 | silica fine particles 7 | 1.0 |

TABLE 5

| Toner No. | Weight average particle diameter [μm] | Amount of trimethylsilanol in silica fine particles [ppm] | A(dmax)/A(0) | A(0) | A(dmax)/A(100) | Thickness of shell [nm] |
|---|---|---|---|---|---|---|
| 1 | 7.1 | 1.5 | 1.36 | 0.069 | 1.54 | 114 |
| 2 | 7.2 | 1.5 | 1.48 | 0.065 | 1.62 | 151 |
| 3 | 7.4 | 1.5 | 1.25 | 0.071 | 1.34 | 116 |
| 4 | 7.3 | 2.8 | 1.48 | 0.059 | 1.78 | 156 |
| 5 | 7.2 | 1.2 | 1.25 | 0.070 | 1.21 | 157 |
| 6 | 7.1 | 2.8 | 1.95 | 0.061 | 1.13 | 200 |
| 7 | 7.3 | 1.2 | 1.08 | 0.074 | 1.24 | 118 |
| 8 | 7.2 | 2.8 | 4.96 | 0.052 | 1.05 | 203 |
| 9 | 7.1 | 1.2 | 1.06 | 0.062 | 1.26 | 114 |
| 10 | 7.0 | 1.3 | 1.06 | 0.069 | 1.24 | 115 |
| 11 | 7.1 | 1.1 | 1.06 | 0.064 | 1.21 | 112 |
| 12 | 7.3 | 1.0 | 1.06 | 0.066 | 1.23 | 116 |
| 13 | 7.2 | 1.0 | 1.05 | 0.019 | 1.22 | 111 |
| 14 | 7.1 | 1.0 | 1.08 | 0.025 | 1.20 | 114 |
| 15 | 7.3 | 4.9 | 4.96 | 0.053 | 1.05 | 116 |
| 16 | 7.2 | 4.8 | 4.96 | 0.052 | 1.05 | 115 |
| 17 | 7.4 | 4.9 | 4.96 | 0.054 | 1.05 | 111 |
| 18 | 7.1 | 4.8 | 5.51 | 0.054 | 1.03 | 153 |
| 19 | 7.2 | 1.0 | — | — | — | 118 |
| 20 | 7.1 | 0.8 | 1.06 | 0.065 | 1.23 | 112 |
| 21 | 7.3 | 0.5 | 1.06 | 0.066 | 1.20 | 117 |
| 22 | 7.4 | 1.0 | 1.02 | 0.032 | 1.16 | 123 |
| 23 | 7.2 | 0.5 | 1.05 | 0.018 | 1.22 | 112 |
| 24 | 7.5 | 8.5 | 1.06 | 0.064 | 1.25 | 118 |
| 25 | 7.5 | 1.3 | 1.05 | 0.014 | 1.21 | 112 |
| 26 | 7.6 | 8.5 | 1.07 | 0.026 | 1.25 | 116 |

Toners 1 to 18 and 20 to 26 each had one or more peaks of the standard value. The toner 19 did not have a peak of the standard value.

Examples 1 to 17, Comparative Examples 1 to 9

The following evaluation was carried out using the toners 1 to 26. The evaluation results are shown in Table 6. Each evaluation method and evaluation standard are described hereinbelow.

A modified LBP-712Ci (manufactured by Canon Inc.), which is a commercially available laser printer, was used as an image forming apparatus. The printer was modified by setting the process speed to 250 mm/sec. A commercially available toner cartridge 040H (cyan) (manufactured by Canon Inc.) was used as a process cartridge. The product toner was removed from the inside of the cartridge, and the cartridge was cleaned by air blowing and then filled with 240 g of toner to be evaluated. Product toners were removed from each of the yellow, magenta, and black stations, and yellow, magenta, and black cartridges with the toner remaining amount detection mechanism disabled were inserted for evaluation.

Test on Storage Stability in Harsh Environment

A total of 240 g of each of the obtained toners 1 to 26 was filled in the toner cartridge and allowed to stand in a low-temperature and low-humidity environment (15° C., 10% RH) for 24 h, and then the environment was changed to a high-temperature and high-humidity environment (55° C., 95% RH) over 24 h. The toners were allowed to stand in the high-temperature and high-humidity environment for 24 h, and then the environment was again changed to the low-temperature and low-humidity environment (15° C., 10% RH) over 24 h. The toner subjected to three cycles of the above operation for 3 cycles was taken out. The time chart of the heat cycle is shown in FIG. 1.

To evaluate image appearance after the toner was allowed to stand under the above harsh conditions, the cartridge was allowed to stand in a high-temperature and high-humidity environment (32.0° C., 80% RH) for 1 day, and then the image density, fogging, and vertical streaks on a halftone image were evaluated in the same environment. In a high-temperature and high-humidity environment, the evaluation is performed under more severe conditions because the flowability of the toner is likely to decrease, the image density is likely to decrease due to toner aggregates, and fogging and vertical streaks on a halftone image are likely to occur.

As an image density test, one solid black image was output with a tip margin of 5 mm and left and right margins of 5 mm. The image density was measured using a Macbeth densitometer (manufactured by Macbeth Co.), which is a reflection densitometer, and an SPI filter. The image density at nine points in the solid black image was measured, and the average value was evaluated as the image density. The criteria for determining the image density are as follows. The evaluation results are shown in Table 6. C or higher was determined to be good.

(Evaluation Criteria for Image Density)

A: Image density is 1.40 or higher

B: Image density is 1.30 or more and less than 1.40

C: Image density is 1.20 or more and less than 1.30

D: Image density is less than 1.20

As a fogging test, one solid white image was output, and the reflectance thereof was measured using REFLECTOMETER MODEL TC-6DS manufactured by Tokyo Denshoku Co., Ltd. Meanwhile, the reflectance of the transfer paper (standard paper) before the formation of the solid white image was measured in the same manner. A green filter was used as the filter. Fogging was calculated using the following formula from the reflectance before and after the solid white image output.

Fogging (reflectance) (%)=reflectance of standard paper (%)−reflectance of white image sample (%)

The criteria for determining the fogging are as follows. The evaluation results are shown in Table 6. C or higher was determined to be good.

(Evaluation Criteria for Fogging)

A: Fogging (reflectance) is less than 1.0%

B: Fogging (reflectance) is 1.0% or more and less than 2.0%

C: Fogging (reflectance) is 2.0% or more and less than 3.0%

D: Fogging (reflectance) is 3.0% or more

As an evaluation of vertical streaks on a halftone image, one halftone image was output, and the presence or absence of vertical streaks, which are so-called development streaks, caused by toner aggregates on the halftone image was visually confirmed. The criteria for determining vertical streaks on the halftone image were as follows. The evaluation results are shown in Table 6. C or higher was determined to be good.

Evaluation Criteria for Vertical Streaks on Halftone Image

A: No vertical streaks can be seen

B: Three or fewer thin streaks can be seen

C: From 4 to 10 thin streaks can be seen

D: 11 or more streaks can be seen

Evaluation of Durability After Storage Stability Test in Harsh Environment

Using the cartridge after the storage stability test in the harsh environment, an image output test in which 2500 prints were output per day was implemented for 4 days for a total of 10000 prints in a high-temperature and high-humidity environment (32.0° C., 80% RH) in a mode that was set such that printing of two horizontal line patterns with a print percentage of 4% was considered one job, the printer was temporarily stopped between jobs and then the next job was started. Then, the image density, fogging, and vertical streaks on the halftone image were evaluated. The evaluation methods and criteria for image density, fogging, and vertical streaks on the halftone image were the same as for the storage stability test in a harsh environment. The evaluation results are shown in Table 6.

TABLE 6

| | | Evaluation 1 After storage under harsh conditions assumed as transportation environment | | | Evaluation 2 After durability use in high-temperature and high-humidity environment after storage under harsh conditions indicated in Evaluation 1 | | |
|---|---|---|---|---|---|---|---|
| Example No. | Toner No. | Image density | Fogging | Vertical streaks on halftone image | Image density | Fogging | Vertical streaks on halftone image |
| 1 | 1 | A (1.46) | A (0.3) | A (0) | A (1.43) | A (0.5) | A (0) |
| 2 | 2 | A (1.45) | A (0.2) | A (0) | A (1.40) | A (0.6) | A (0) |
| 3 | 3 | A (1.43) | A (0.5) | A (0) | A (1.41) | A (0.6) | A (0) |
| 4 | 4 | A (1.44) | A (0.5) | A (0) | A (1.40) | A (0.8) | A (0) |
| 5 | 5 | A (1.42) | A (0.8) | A (0) | A (1.40) | A (0.9) | A (0) |
| 6 | 6 | A (1.44) | B (1.1) | A (0) | A (1.40) | B (1.3) | A (0) |
| 7 | 7 | B (1.39) | A (0.9) | A (0) | B (1.36) | A (0.9) | A (0) |
| 8 | 8 | A (1.40) | B (1.3) | B (1) | B (1.38) | B (1.8) | B (3) |

TABLE 6-continued

| Example No. | Toner No. | Evaluation 1 After storage under harsh conditions assumed as transportation environment: Image density | Evaluation 1: Fogging | Evaluation 1: Vertical streaks on halftone image | Evaluation 2 After durability use in high-temperature and high-humidity environment after storage under harsh conditions indicated in Evaluation 1: Image density | Evaluation 2: Fogging | Evaluation 2: Vertical streaks on halftone image |
|---|---|---|---|---|---|---|---|
| 9 | 9 | B (1.36) | A (0.9) | B (2) | B (1.33) | B (1.3) | B (3) |
| 10 | 10 | B (1.35) | A (0.8) | B (2) | B (1.30) | B (1.5) | B (3) |
| 11 | 11 | B (1.33) | A (0.8) | B (1) | B (1.30) | B (1.5) | B (3) |
| 12 | 12 | B (1.33) | A (0.8) | B (1) | B (1.30) | B (1.5) | C (4) |
| 13 | 13 | B (1.32) | A (0.7) | B (1) | B (1.30) | B (1.7) | C (4) |
| 14 | 14 | B (1.34) | A (0.9) | B (1) | B (1.31) | B (1.8) | C (5) |
| 15 | 15 | B (1.36) | B (1.4) | C (5) | C (1.29) | C (2.5) | C (8) |
| 16 | 16 | B (1.38) | B (1.3) | C (4) | C (1.28) | C (2.4) | C (7) |
| 17 | 17 | B (1.36) | B (1.5) | C (5) | C (1.27) | C (2.6) | C (9) |
| C.E. 1 | 18 | B (1.34) | B (1.7) | C (6) | B (1.31) | C (2.4) | D (11) |
| C.E. 2 | 19 | B (1.31) | B (1.6) | D (11) | C (1.28) | B (1.5) | D (14) |
| C.E. 3 | 20 | B (1.33) | C (2.3) | D (11) | C (1.25) | C (2.8) | D (12) |
| C.E. 4 | 21 | B (1.31) | B (1.9) | D (11) | C (1.28) | C (2.7) | D (13) |
| C.E. 5 | 22 | B (1.31) | B (1.6) | D (11) | C (1.28) | B (1.5) | D (12) |
| C.E. 6 | 23 | B (1.30) | C (2.0) | D (12) | C (1.26) | C (2.9) | D (14) |
| C.E. 7 | 24 | B (1.31) | D (3.1) | D (13) | C (1.28) | D (3.3) | D (15) |
| C.E. 8 | 25 | B (1.32) | C (2.6) | D (11) | C (1.26) | C (2.8) | D (12) |
| C.E. 9 | 26 | B (1.31) | D (3.3) | D (13) | C (1.21) | D (3.3) | D (16) |

In the Table, "C.E" indicates "Comparative Example".

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-076193, filed Apr. 28, 2021, which is hereby incorporated by reference herein in its entirety.

What is claimed is:

1. A toner comprising:

a toner particle comprising a binder resin and a hydrocarbon wax; and an inorganic fine particle, wherein the toner comprises, as the inorganic fine particle, a silica fine particle surface-treated with a polydimethylsiloxane represented by a following formula (A) and a polydimethylsiloxane represented by a following formula (B);

a total amount of trimethylsilanol in terms of octamethyltrisiloxane based on the mass of the silica fine particle in organic volatile component analysis of the silica fine particle at a heating temperature of 150° C. by a headspace method is 1.0 to 5.0 ppm;

where, in a measurement of the toner particle by time-of-flight secondary ion mass spectrometry measured from the surface of the toner particle to a depth of 100 nm, a value obtained by dividing an amount of ions of a structure represented by a following formula (C) by a total amount of counted ions is taken as a standard value, at least one peak of the standard value is present within a range of 100 nm from the surface of the toner particle;

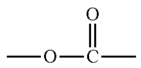

(C)

where the maximum value among the at least one peak of the standard value is denoted by A(d max), and the standard value on the toner particle surface is denoted by A(0), the A(d max) and the A(0) satisfy following formulas (1) and (2):

$$1.05 \leq A(dmax)/A(0) \leq 5.00 \quad (1)$$

$$A(0) \geq 0.010 \quad (2)$$

(A)

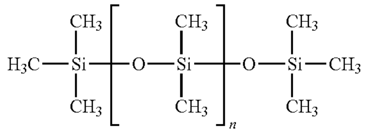

(B)

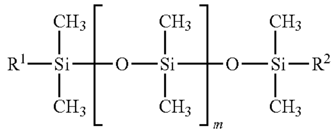

where, in the formula (B), $R^1$ is a carbinol group, a hydroxy group, an epoxy group, a carboxy group, an alkyl group, or a hydrogen atom, and $R^2$ is a carbinol group, a hydroxy group, an epoxy group, a carboxy group, or a hydrogen atom; n and m are average numbers of repeating units, n is 30 to 200, and m is 30 to 200; and each methyl group ($—CH_3$) of side chains in the formula (B) may be substituted with a carbinol group, a hydroxy group, an epoxy group, a carboxy group, or a hydrogen atom.

2. The toner according to claim 1, wherein the polydimethylsiloxane represented by the formula (B) is a polydimethylsiloxane represented by a following formula (D).

(D)

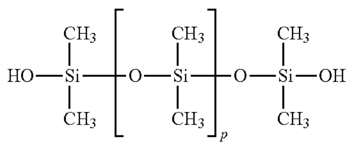

In the formula (D), p is the average number of repeating units, which is from 30 to 200.

3. The toner according to claim 1, wherein the silica fine particle has a number average particle diameter of primary particle of 5 to 30 nm.

4. The toner according to claim 1, wherein where the standard value at a position at a depth of 100 nm from the surface of the toner particle among the standard values in the analysis by the time-of-flight type secondary ion mass spectrometry is denoted by A(100), the A(dmax) and the A(100) satisfy a following formula (3):

$$1.05 \leq A(dmax)/A(100) \leq 5.00 \quad (3).$$

5. The toner according to claim 1, wherein the binder resin comprises a polyester resin;

the polyester resin comprises a monomer unit represented by a following formula (E), a monomer unit represented by a following formula (F), and a monomer unit represented by a following formula (G);

a content ratio of the monomer unit represented by the following formula (E) in the polyester resin is 30 to 50% by mass;

a content ratio of the monomer unit represented by the following formula (F) in the polyester resin is 25 to 50% by mass; and a content ratio of the monomer unit represented by the following formula (G) in the polyester resin is 0.4 to 50% by mass:

(E)

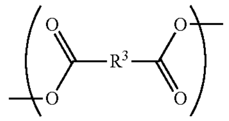

(F)

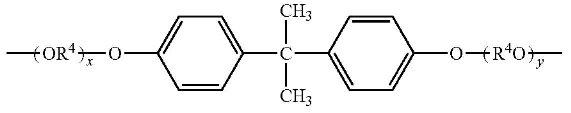

(G)

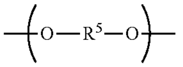

where, in the formula (E), $R^3$ represents a benzene ring, in the formula (F), $R^4$ each represent an ethylene group or a propylene group, x and y are each an integer of 1 or more, and an average value of x+y is 2 to 10, in the formula (G), $R^5$ represents an ethylene group or a propylene group.

6. The toner according to claim 5, wherein the toner particle comprises a core particle, and a shell on a surface of the core particle;

the core particle comprises a styrene-acrylic resin; and the shell comprises the polyester resin.

7. The toner according to claim 6, wherein, in cross-sectional observation of the toner with a transmission electron microscope, an average value of a thickness of the shell is 100 to 200 nm.

8. The toner according to claim 1, wherein the binder resin comprises a polyester resin, and the polyester resin comprises a monomer unit represented by a following formula (H).

(H)

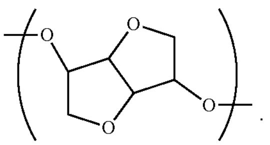

9. The toner according to claim 6, wherein a content ratio of the monomer unit represented by the formula (H) in the polyester resin is 1.0 to 4.0% by mass.

10. A toner comprising:

a toner particle comprising a styrene-acrylic resin, a polyester resin and a hydrocarbon wax; and an inorganic fine particle, wherein the inorganic fine particle comprises a silica fine particle surface-treated with a polydimethylsiloxane represented by a following formula (A) and a polydimethylsiloxane represented by a following formula (B);

the toner particle comprises a core particle, and a shell on a surface of the core particle;

the core particle comprises the styrene-acrylic resin;

the shell comprises the polyester resin;

an average value of a thickness of the shell in cross-sectional observation of the toner with a transmission electron microscope is 100 to 200 nm;

where, in a measurement of the toner particle by time-of-flight secondary ion mass spectrometry measured from the surface of the toner particle to a depth of 100 nm, a value obtained by dividing an amount of ions of a structure represented by a following formula (C) by a total amount of counted ions is taken as a standard value, at least one peak of the standard value is present within a range of 100 nm from the surface of the toner particle;

(C)

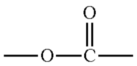

where the maximum value among the at least one peak of the standard value is denoted by A(d max), and the standard value on the toner particle surface is denoted by A(0), the A(d max) and the A(0) satisfy following formulas (1) and (2):

$$1.05 \le A(dmax)/A(0) \le 5.00 \quad (1)$$

$$A(0) \ge 0.010 \quad (2)$$

(A)

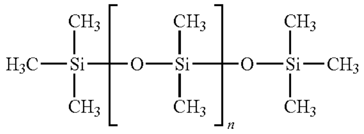

-continued (B)

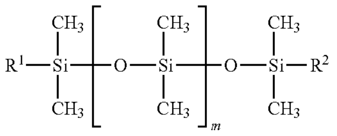

where, in the formula (B), $R^1$ is a carbinol group, a hydroxy group, an epoxy group, a carboxy group, an alkyl group, or a hydrogen atom, and $R^2$ is a carbinol group, a hydroxy group, an epoxy group, a carboxy group, or a hydrogen atom; n and m are average numbers of repeating units, n is 30 to 200, and m is 30 to 200; and each methyl group ($-CH_3$) of side chains in the formula (B) may be substituted with a carbinol group, a hydroxy group, an epoxy group, a carboxy group, or a hydrogen atom.

11. The toner according to claim 10, wherein a surface treatment amount of the polydimethylsiloxane represented by the formula (A) is 3 to 40 parts by mass with respect to 100 parts by mass of the silica fine particle before a surface treatment, and a mass ratio (B)/(A) of the polydimethylsiloxane represented by the formula (B) to the polydimethylsiloxane represented by the formula (A) in the surface treatment is 0.05 to 10.00.

* * * * *